US008866943B2

(12) United States Patent
Park et al.

(10) Patent No.: US 8,866,943 B2
(45) Date of Patent: Oct. 21, 2014

(54) VIDEO CAMERA PROVIDING A COMPOSITE VIDEO SEQUENCE

(75) Inventors: Minwoo Park, Pittsford, NY (US); Amit Singhal, Pittsford, NY (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/416,199

(22) Filed: Mar. 9, 2012

(65) Prior Publication Data

US 2013/0235224 A1    Sep. 12, 2013

(51) Int. Cl.
*H04N 9/07* (2006.01)
*H04N 13/02* (2006.01)
*H04N 7/18* (2006.01)

(52) U.S. Cl.
USPC .............................. 348/267; 348/47; 348/139

(58) Field of Classification Search
USPC ...................... 348/47, 48, 139, 267
See application file for complete search history.

(56) References Cited

U.S. PATENT DOCUMENTS

| | | |
|---|---|---|
| 3,971,065 A | 7/1976 | Bayer |
| 4,642,678 A | 2/1987 | Cok |
| 4,774,574 A | 9/1988 | Daly et al. |
| 5,189,511 A | 2/1993 | Parulski et al. |
| 5,493,335 A | 2/1996 | Parulski et al. |
| 5,652,621 A | 7/1997 | Adams, Jr. et al. |
| 5,668,597 A | 9/1997 | Parulski et al. |
| 6,192,162 B1 | 2/2001 | Hamilton, Jr. et al. |
| 6,292,218 B1 | 9/2001 | Parulski et al. |
| 6,934,056 B2 | 8/2005 | Gindele et al. |
| 7,443,447 B2 * | 10/2008 | Shirakawa ............... 348/376 |
| 7,542,077 B2 | 6/2009 | Miki |
| 7,865,834 B1 | 1/2011 | van Os et al. |
| 2003/0007700 A1 | 1/2003 | Gutta et al. |
| 2003/0117501 A1 | 6/2003 | Shirakawa |
| 2005/0036044 A1 * | 2/2005 | Funakura ............... 348/239 |
| 2007/0024931 A1 | 2/2007 | Compton et al. |
| 2008/0112621 A1 | 5/2008 | Gallagher et al. |
| 2009/0295832 A1 | 12/2009 | Takatsuka et al. |
| 2010/0141784 A1 * | 6/2010 | Yoo ......................... 348/222.1 |
| 2010/0157022 A1 * | 6/2010 | Choi et al. ................ 348/48 |
| 2011/0001878 A1 | 1/2011 | Jiang et al. |
| 2011/0164105 A1 | 7/2011 | Lee et al. |
| 2011/0243474 A1 | 10/2011 | Ito |
| 2013/0235224 A1 | 9/2013 | Park |

OTHER PUBLICATIONS

Collins, "Mean-shift Blob Tracking through Scale Space," IEEE Computer Vision and Pattern Recognition, pp. 234-240 (2003).
Verma et al., "Face detection and tracking in a video by propagating detection probabilities," IEEE Transactions on Pattern Analysis and Machine Intelligence, pp. 1215-1228 (2003).

(Continued)

*Primary Examiner* — Nhan T Tran
*Assistant Examiner* — Chan Nguyen
(74) *Attorney, Agent, or Firm* — Wong, Cabello, Lutsch, Rutherford & Brucculeri, LLP

(57) ABSTRACT

A digital camera system including a first video capture unit for capturing a first digital video sequence of a scene and a second video capture unit that simultaneously captures a second digital video sequence that includes the photographer. A data processor automatically analyzes first digital video sequence to determine a low-interest spatial image region. A facial video sequence including the photographer's face is extracted from the second digital video sequence, and inserted into the low-interest spatial image region in the first digital video sequence to form the composite video sequence.

25 Claims, 11 Drawing Sheets

(56) References Cited

OTHER PUBLICATIONS

Lucas et al., "An iterative image registration technique with an application to stereo vision," Proc. Imaging Understanding Workshop, pp. 121-130 (1981).

Shi et al., "Good features to track," Proc. IEEE Conference on Computer Vision and Pattern Recognition, pp. 593-600 (1994).

Pass et al., "Comparing images using joint histograms," Multimedia Systems, pp. 234-240 (1999).

Itti et al., "Computational modeling of visual attention," Nature Reviews: Neuroscience, pp. 194-203 (2001).

Tardif et al., "Non-iterative approach for fast and accurate vanishing point detection," Proc. IEEE International Conference on Computer Vision, pp. 1250-1257 (2009).

Clarke et al., "Detection and tracking of independent motion," Image and Vision Computing, pp. 565-572 (1996).

\* cited by examiner

VIDEO CAMERA PROVIDING A COMPOSITE VIDEO SEQUENCE

CROSS-REFERENCE TO RELATED APPLICATIONS

Reference is made to U.S. patent application Ser. No. 13/416,166, entitled: "Composite video sequence with inserted facial region," by Park et al., which is incorporated herein by reference.

FIELD OF THE INVENTION

This invention pertains to the field of digital imaging and more particularly to a digital camera system for forming a composite video sequence.

BACKGROUND OF THE INVENTION

Recording videos using a smart phone or a digital video recorder has become a commonplace occurrence. However, the person recording the video is generally excluded from the captured video. For example, a father desires to record a family event, but he is out of the scene and the only indication of his presence is the audio signal. Although the father can choose to turn the camera round to capture a video of himself afterward, his real-time reaction and expression during the family event is gone already. Therefore, there remains a need for a method and system to record a video memory that includes both the photographer and the scene participants at the same time.

U.S. Patent Application Publication 2011/0243474 to Ito, entitled "Video image processing apparatus and video image processing method," presents relevant information about an object of interest to a viewer in an appropriate timing based on the display state of objects that appear in a video image. A video image processing apparatus processes the additional information including content data and relevant information about the respective objects. A display feature information calculation unit acquires frame data indicating the display state of an object to be displayed in each frame constituting video data and calculates display feature information about the object to be displayed in each frame. A frame evaluation unit evaluates a frame using an evaluation criteria relating to the degree of attention of the object within a frame based on the calculated display feature information. A display timing determination unit determines a frame at which displaying relevant information about the object is to be started in accordance with the frame evaluation result. A display data generation unit generates data for displaying relevant information about an object, and a superimpose unit superimposes the data with video data, and output the superimposed data to a display unit.

U.S. Pat. No. 7,443,447 to Hirotsugu, entitled "Camera device for portable equipment," discloses a camera device capturing a plurality of images and superimposing them to output image data of a superimposed image. The plurality of images is captured by a plurality of cameras. A processor superimposes the plurality of images to produce the superimposed image, which is displayed on screen and is sent by moving-image mail. This approach has the disadvantage that the superimposed image can often obstruct important features of the background image.

U.S. Patent Application Publication 2003/0007700 to Buchanan et al., entitled "Method and apparatus for interleaving a user image in an original image sequence," discloses an image processing system that allows a user to participate in a given content selection or to substitute any of the actors or characters in the content selection. The user can modify an image by replacing an image of an actor with an image of the corresponding user (or a selected third party). Various parameters associated with the actor to be replaced are estimated for each frame. A static model is obtained of the user (or the selected third party). A face synthesis technique modifies the user model according to the estimated parameters associated with the selected actor. A video integration stage superimposes the modified user model over the actor in the original image sequence to produce an output video sequence containing the user (or selected third party) in the position of the original actor.

U.S. Patent Application Publication 2009/0295832 to Susumu et al., entitled "Display processing device, display processing method, display processing program, and mobile terminal device," discloses a display processing device including a face image detecting unit for detecting the user's face image based on imaging data output from a camera unit provided on a cabinet, a position/angle change detecting unit for detecting a change in the position of the user's face image and a change in the face angle, and a display control unit that displays a predetermined image on a display unit, moves the position of the display image in accordance with a change in the position of the detected user's face image, the change occurring in the x-axis direction and the y-axis direction, performs enlargement/reduction processing based on a position change in the z-axis direction, performs rotating processing in accordance with a change in the face angle so that an image viewed from the face angle is obtained, and displays the obtained image on the display unit.

U.S. Pat. No. 7,865,834 to Marcel et al., entitled "Multi-way video conferencing user interface," discloses a videoconferencing application that includes a user interface that provides multiple participant panels, each of which is displayed using perspective, with the panels appearing to be angled with respect to the user interface window. The participant panels display live video streams from remote participants. A two-way layout provides two participant panels for two remote participants, each of which is angled inwardly towards a center position. A three-way layout provides three participant panels for three remote participants, with a left, center and right panel, with the left and right panels angled inwardly towards a center position.

U.S. Patent Application Publication 2011/0164105 to Lee et al., entitled "Automatic video stream selection," discloses an automatic video stream selection method where a handheld communication device is used to capture video streams and generate a multiplexed video stream. The handheld communication device has at least two cameras facing in two opposite directions. The handheld communication device receives a first video stream and a second video stream simultaneously from the two cameras. The handheld communication device detects a speech activity of a person captured in the video streams. The speech activity may be detected from direction of sound or lip movement of the person. Based on the detection, the handheld communication device automatically switches between the first video stream and the second video stream to generate a multiplexed video stream. The multiplexed video stream interleaves segments of the first video stream and segments of the second video stream.

In an alternative embodiment, the handheld phone may provide a "picture-in-picture" feature, which can be activated by a user. When the feature is activated, the video stream of interest can be shown on the entire area of the display screen, while the other video stream can be shown in a thumb-nail sized area at a corner of the display screen. For example, in the interview mode, the image of the talking person can be shown on the entire area of the display screen, while the image of the non-talking person can be shown in a thumb-nail sized area at a corner of the display screen. The multiplexed video stream includes interleaving segments of the first video stream and segments of the second video stream, with each frame of the multiplexed video stream containing "a picture in a picture," in which a small image from one video stream is superimposed on a large background image from another video stream. However, similar to aforementioned U.S. Pat. No. 7,443,447, it has the disadvantage that the superimposed video image can often obstruct important portions of the background video stream.

U.S. Patent Application Publication 2011/0001878 to Libiao et al., entitled "Extracting geographic information from TV signal to superimpose map on image," discloses a method for extracting geographic information from TV signal to superimpose a map on the image. Optical character recognition (OCR) is used to extract text from a TV image or voice recognition is used to extract text from the TV audio signal. If a geographic place name is recognized in the extracted text, a relevant map is displayed in a picture-in-picture window superimposed the TV image. The user may be given the option of turning the map feature on and off, defining how long the map is displayed, and defining the scale of the map to be displayed.

SUMMARY OF THE INVENTION

The present invention represents a digital camera system providing composite video sequence, comprising:
- a first video capture unit;
- a second video capture unit;
- a data processing system;
- a storage memory for storing captured video sequences; and
- a program memory communicatively connected to the data processing system and storing instructions configured to cause the data processing system to implement a method for forming a composite digital video sequence wherein the method includes:
  - using the first video capture unit to capture a first digital video sequence of a scene, the first digital video sequence including a first temporal sequence of video frames;
  - using the second video capture unit to capture a second digital video sequence including a second temporal sequence of video frames, wherein the second digital video sequence is captured simultaneously with the first digital video sequence and includes the photographer;
  - analyzing the first digital video sequence to determine a spatial image region having image content of low interest;
  - extracting a facial video sequence from the second digital video sequence corresponding to a facial image region in the second digital video sequence that includes the photographer's face;
  - inserting the extracted facial video sequence into the determined low-interest image region in the first digital video sequence to form the composite video sequence; and
  - storing the composite digital video sequence in the storage memory.

This invention has the advantage that the composite digital video sequence includes the photographer so that he or she can be included in the captured memory. This also allows the viewer of the composite digital video sequence to see the photographer's reaction to the events occurring in the scene.

It has the additional advantage that the location that the facial video sequence is inserted into the composite video is automatically chosen to avoid overlapping with high-interest scene content.

It has the further advantage that the inserted facial video can be inserted in a variety of ways that can provide entertainment value to the viewer.

Figure 1:
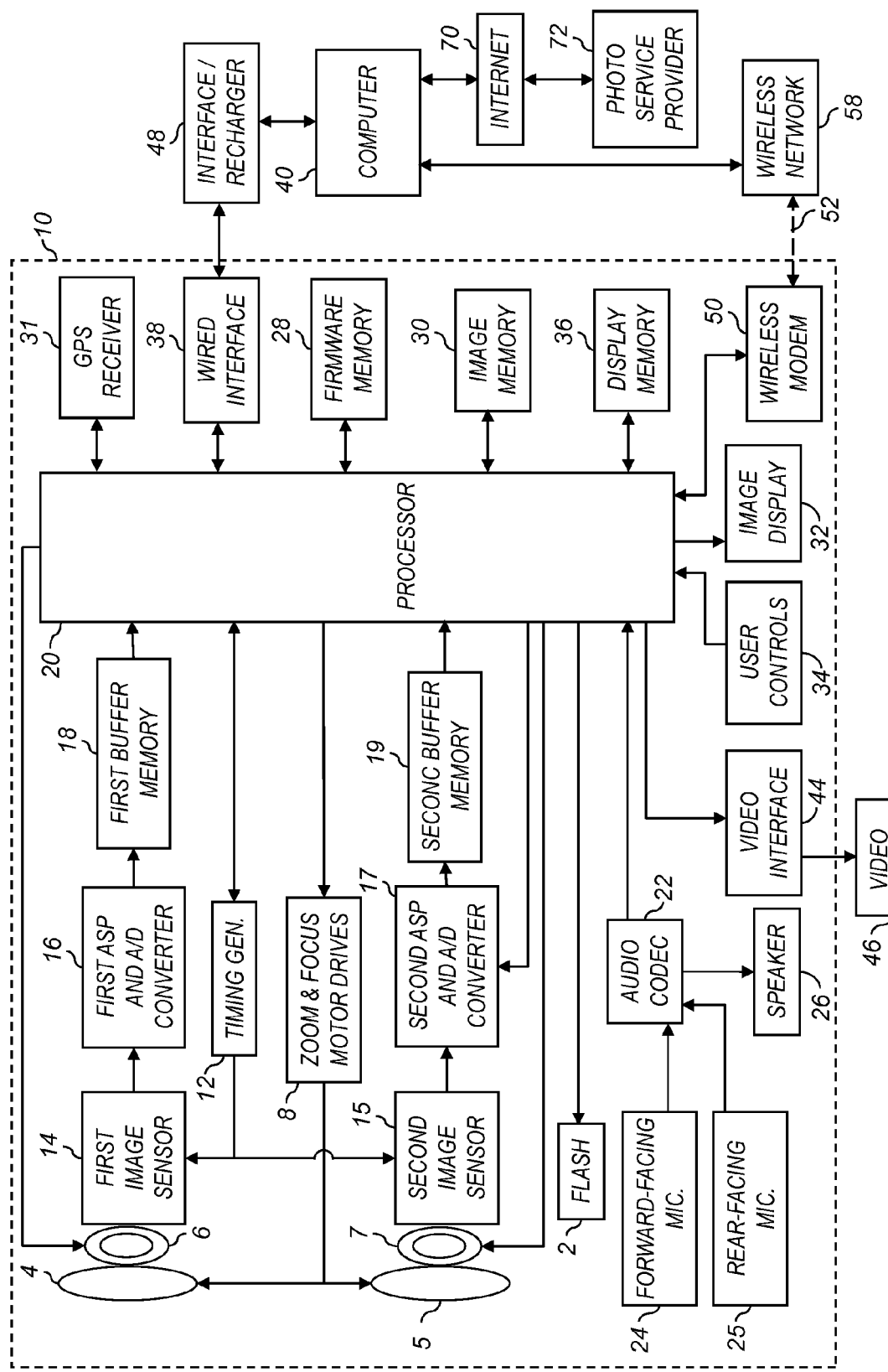
FIG. 1 is a high-level diagram showing the components of a digital camera system for providing a composite digital video sequence in accordance with the present invention.

It is to be understood that the attached drawings are for purposes of illustrating the concepts of the invention and may not be to scale.

DETAILED DESCRIPTION OF THE INVENTION

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, a computer program for performing the method of the present invention can be stored in a non-transitory, tangible computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Because digital cameras employing imaging devices and related circuitry for signal capture and processing, and display are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

The following description of a digital camera will be familiar to one skilled in the art. It will be obvious that there are many variations of this embodiment that are possible and are selected to reduce the cost, add features or improve the performance of the camera.

FIG. 1 depicts a block diagram of a digital photography system, including a digital camera 10 in accordance with the present invention. Preferably, the digital camera 10 is a portable battery operated device, small enough to be easily handheld by a user when capturing and reviewing images. The digital camera 10 produces digital images that are stored as digital image files using image memory 30. The phrase "digital image" or "digital image file", as used herein, refers to any digital image file, such as a digital still image or a digital video file.

In some embodiments, the digital camera 10 captures both motion video images and still images. The digital camera 10 can also include other functions, including, but not limited to, the functions of a digital music player (e.g. an MP3 player), a mobile telephone, a GPS receiver, or a programmable digital assistant (PDA).

The digital camera 10 includes a forward-facing lens 4 having a first adjustable aperture and adjustable shutter 6 and a rear-facing lens 5 having a second adjustable aperture and adjustable shutter 7. In a preferred embodiment, the forward-facing lens 4 and the rear-facing lens 5 are zoom lenses and are controlled by zoom and focus motor drives 8. In other embodiments, one or both of the forward-facing lens 4 and the rear-facing lens 5 may use a fixed focal length lens with either variable or fixed focus. The forward-facing lens 4 focuses light from a scene (not shown) onto a first image sensor 14, for example, a single-chip color CCD or CMOS image sensor. The forward-facing lens 4 is one type optical system for forming an image of the scene on the first image sensor 14. The rear-facing lens 5 focuses light from a scene (not shown) onto a second image sensor 15. The first image sensor 14 and the second image sensor can be, for example, single-chip color CCDs or CMOS image sensors.

The output of the first image sensor 14 is converted to digital form by first Analog Signal Processor (ASP) and Analog-to-Digital (A/D) converter 16, and temporarily stored in first buffer memory 18. The output of the second image sensor 15 is converted to digital form by second ASP and A/D converter 17, and temporarily stored in second buffer memory 19. The image data stored in the first buffer memory and the second buffer memory 19 is subsequently manipulated by a processor 20, using embedded software programs (e.g. firmware) stored in firmware memory 28. In some embodiments, the software program is permanently stored in firmware memory 28 using a read only memory (ROM). In other embodiments, the firmware memory 28 can be modified by using, for example, Flash EPROM memory. In such embodiments, an external device can update the software programs stored in firmware memory 28 using a wired interface 38 or a wireless modem 50. In such embodiments, the firmware memory 28 can also be used to store image sensor calibration data, user setting selections and other data which must be preserved when the camera is turned off. In some embodiments, the processor 20 includes a program memory (not shown), and the software programs stored in the firmware memory 28 are copied into the program memory before being executed by the processor 20.

It will be understood that the functions of processor 20 can be provided using a single programmable processor or by using multiple programmable processors, including one or more digital signal processor (DSP) devices. Alternatively, the processor 20 can be provided by custom circuitry (e.g., by one or more custom integrated circuits (ICs) designed specifically for use in digital cameras), or by a combination of programmable processor(s) and custom circuits. It will be understood that connectors between the processor 20 from some or all of the various components shown in FIG. 1 can be made using a common data bus. For example, in some embodiments the connection between the processor 20, the first buffer memory 18, the second buffer memory 19, the image memory 30, and the firmware memory 28 can be made using a common data bus.

The processed images are then stored using the image memory 30. It is understood that the image memory 30 can be any form of memory known to those skilled in the art including, but not limited to, a removable Flash memory card, internal Flash memory chips, magnetic memory, or optical memory. In some embodiments, the image memory 30 can include both internal Flash memory chips and a standard interface to a removable Flash memory card, such as a Secure Digital (SD) card. Alternatively, a different memory card format can be used, such as a micro SD card, Compact Flash (CF) card, MultiMedia Card (MMC), xD card or Memory Stick.

In a preferred embodiment, the first image sensor 14 and the second image sensor 15 are controlled by a timing generator 12, which produces various clocking signals to select rows and pixels, and synchronizes the operation of the first ASP and A/D converter 16 and the second ASP and A/D converter 17. In some embodiments, the timing generator 12 can control the first image sensor 14 and the second image sensor 15 responsive to user settings supplied by user controls 34.

The first image sensor 14 and the second image sensor 15 can have, for example, 12.4 megapixels (4088×3040 pixels) in order to provide a still image file of approximately 4000×3000 pixels. To provide a color image, the image sensors are generally overlaid with a color filter array, which provides an image sensor having an array of pixels that include different colored pixels. The different color pixels can be arranged in many different patterns. As one example, the different color pixels can be arranged using the well-known Bayer color filter array, as described in U.S. Pat. No. 3,971,065, "Color imaging array" to Bayer, the disclosure of which is incorporated herein by reference. As a second example, the different color pixels can be arranged as described in U.S. Patent Application Publication 2007/0024931 to Compton and Hamilton, entitled "Image sensor with improved light sensitivity," the disclosure of which is incorporated herein by reference. These examples are not limiting, and many other color patterns may be used.

It will be understood that the first image sensor 14, the second image sensor 15, the timing generator 12, the first ASP and A/D converter 16, and the second ASP and A/D converter 17 can be separately fabricated integrated circuits, or they can be fabricated as one or more composite integrated circuits that perform combined functions as is commonly done with CMOS image sensors. In some embodiments, this composite integrated circuit can perform some of the other functions shown in FIG. 1, including some of the functions provided by processor 20.

The first image sensor 14 and the second image sensor 15 are effective when actuated in a first mode by timing generator 12 for providing a motion sequence of lower resolution sensor image data, which is used when capturing video images and also when previewing a still image to be captured, in order to compose the image. This preview mode sensor image data can be provided as HD resolution image data, for example, with 1280×720 pixels, or as VGA resolution image data, for example, with 640×480 pixels, or using other resolutions which have significantly fewer columns and rows of data, compared to the resolution of the image sensor.

The preview mode sensor image data can be provided by combining values of adjacent pixels having the same color, or by eliminating some of the pixels values, or by combining some color pixels values while eliminating other color pixel values. The preview mode image data can be processed as described in commonly assigned U.S. Pat. No. 6,292,218 to Parulski, et al., entitled "Electronic camera for initiating capture of still images while previewing motion images," which is incorporated herein by reference.

The first image sensor 14 and the second image sensor 15 are also effective when actuated in a second mode by timing generator 12 for providing high resolution still image data. This final mode sensor image data is provided as high resolution output image data, which for scenes having a high illumination level includes all of the pixels of the image sensor, and can be, for example, a 12 megapixel final image data having 4000×3000 pixels. At lower illumination levels, the final sensor image data can be provided by "binning" some number of like-colored pixels on the image sensor, in order to increase the signal level and thus the "ISO speed" of the sensor.

The zoom and focus motor drives 8 are controlled by control signals supplied by the processor 20, to provide the appropriate focal length setting and to focus the scene onto one or both of the first image sensor 14 and the second image sensor 15. The exposure level provided to the first image sensor 14 is controlled by controlling the F/# and exposure time of the first adjustable aperture and adjustable shutter 6, controlling an integration time of the first image sensor 14 via the timing generator 12, and controlling the gain (i.e., the ISO speed) setting of the first ASP and A/D converter 16. Likewise, the exposure level provided to the second image sensor 15 is controlled by controlling the F/# and exposure time of the second adjustable aperture and adjustable shutter 7, controlling an integration time of the second image sensor 15 via the timing generator 12, and controlling the gain (i.e., the ISO speed) setting of the second ASP and A/D converter 17.

The processor 20 also controls a flash 2 which can illuminate the scene in situations where there is an insufficient ambient light level. In some embodiments, the flash 2 may illuminate the portion of the scene imaged onto the first image sensor 14 or the second image sensor 15. In some embodiments two separate flashes 2 can be provided, one directed to illuminate the portion of the scene imaged by the first image sensor 14 and the other directed to illuminate the portion of the scene imaged by the second image sensor 15.

In some embodiments, the forward-facing lens 4, the rear-facing lens 5, or both, can be focused by using "through-the-lens" autofocus, as described in U.S. Pat. No. 5,668,597, entitled "Electronic Camera with Rapid Automatic Focus of an Image upon a Progressive Scan Image Sensor" to Parulski et al., which is incorporated herein by reference. This is accomplished by using the zoom and focus motor drives 8 to adjust the focus position of the forward-facing lens 4 (or the rear-facing lens 5) to a number of positions ranging between a near focus position to an infinity focus position, while the processor 20 determines the closest focus position which provides a peak sharpness value for a central portion of the image captured by the first image sensor 14 (or the second image sensor 15). The focus distance which corresponds to the closest focus position can then be utilized for several purposes, such as automatically setting an appropriate scene mode, and can be stored as metadata in the image file, along with other lens and camera settings.

In a preferred embodiment, the processor 20 produces menus and low resolution color images that are temporarily stored in display memory 36 and are displayed on image display 32. The image display 32 is typically an active matrix color liquid crystal display (LCD), although other types of displays, such as organic light emitting diode (OLED) displays, can be used. A video interface 44 provides a video output signal from the digital camera 10 to a video display 46, such as a flat panel HDTV display. In preview mode, or video mode, the digital image data from the first buffer memory 18 or the second buffer memory 19 is manipulated by processor 20 to form a series of motion preview images that are displayed, typically as color images, on the image display 32. In composite mode, the digital image data from both the first buffer memory 18 and the second buffer memory 19 is manipulated by the processor 20 to form a series of composited preview video sequences that are displayed on the image display 32. In review mode, the images displayed on the image display 32 are produced using the image data from the digital image files stored in image memory 30.

The graphical user interface displayed on the image display 32 is controlled in response to user input provided by the user controls 34. The user controls 34 are used to select various camera modes, such as video capture mode, still capture mode, composite mode, and review mode, and to initiate capture of still images, recording of motion images.

The user controls 34 are also used to set user processing preferences, and to choose between various photography modes based on scene type and taking conditions. In some embodiments, various camera settings may be set automatically in response to analysis of preview image data, audio signals, or external signals such as GPS signals (sensed by a GPS receiver 31), weather broadcasts, or other available signals.

In some embodiments, when the digital camera is in a still photography mode the above-described preview mode is initiated when the user partially depresses a shutter button, which is one of the user controls 34, and the still image capture mode is initiated when the user fully depresses the shutter button. The user controls 34 are also used to turn on the camera, control the forward-facing lens 4 and the rear-facing lens 5, and initiate the picture taking process. User controls 34 typically include some combination of buttons, rocker switches, joysticks or rotary dials. In some embodiments, some of the user controls 34 are provided by using a touch sensitive surface, such a touch screen overlay on the image display 32. In other embodiments, the user controls 34 can include a means to receive input from the user or an external device via a tethered, wireless, voice activated, visual or other interface. In other embodiments, additional status displays or images displays can be used.

The camera modes that can be selected using the user controls 34 include a "timer" mode. When the "timer" mode is selected, a short delay (e.g., 10 seconds) occurs after the user fully presses the shutter button, before the processor 20 initiates the capture of a still image.

An audio codec 22 connected to the processor 20 receives an input audio signal from a forward-facing microphone 24 and provides an output audio signal to a speaker 26. In a preferred embodiment, the audio codec 22 also receives a second input audio signal from a rear-facing microphone 25. These components can be used to record and playback an audio track associated with a video sequence or a still image. If the digital camera 10 is a multi-function device such as a combination camera and mobile phone, the forward-facing microphone 24, the rear-facing microphone 25, and the speaker 26 can also be used for telephone conversations.

In some embodiments, the speaker 26 can be used as part of the user interface, for example to provide various audible signals which indicate that a user control has been depressed, or that a particular mode has been selected. In some embodiments, the forward-facing microphone 24, the rear-facing microphone 25, the audio codec 22, and the processor 20 can be used to provide voice recognition, so that the user can provide a user input to the processor 20 by using voice commands, rather than user controls 34. The speaker 26 can also be used to inform the user of an incoming phone call. This can be done using a standard ring tone stored in firmware memory 28, or by using a custom ring-tone downloaded from a wireless network 58 and stored in the image memory 30. In addition, a vibration device (not shown) can be used to provide a silent (e.g., non audible) notification of an incoming phone call.

The processor 20 also provides additional processing of the image data from the first image sensor 14 (or the second image sensor 15), in order to produce rendered sRGB image data which is compressed and stored within a "finished" image file, such as a well-known Exif-JPEG image file, in the image memory 30.

The digital camera 10 can be connected via the wired interface 38 to an interface/recharger 48, which is connected to a computer 40, which can be a desktop computer or portable computer located in a home or office. The wired interface 38 can conform to, for example, the well-known USB 2.0 interface specification. The interface/recharger 48 can provide power via the wired interface 38 to a set of rechargeable batteries (not shown) in the digital camera 10.

In some embodiments, the digital camera 10 can include wireless modem 50, which interfaces over a radio frequency band 52 with the wireless network 58. The wireless modem 50 can use various wireless interface protocols, such as the well-known Bluetooth wireless interface or the well-known 802.11 wireless interface. In some embodiments, the wireless modem 50 includes a wireless modem buffer memory which can be used to store a video sequence and an audio signal transmitted over the wireless network 58. The computer 40 can upload images via the Internet 70 to a photo service provider 72, such as the Kodak EasyShare Gallery. Other devices (not shown) can access the images stored by the photo service provider 72.

In some embodiments, the wireless modem 50 communicates over a radio frequency (e.g. wireless) link with a mobile phone network (not shown), such as a 3GSM network, which connects with the Internet 70 in order to upload digital image files from the digital camera 10. These digital image files can be provided to the computer 40 or the photo service provider 72.

Figure 2:
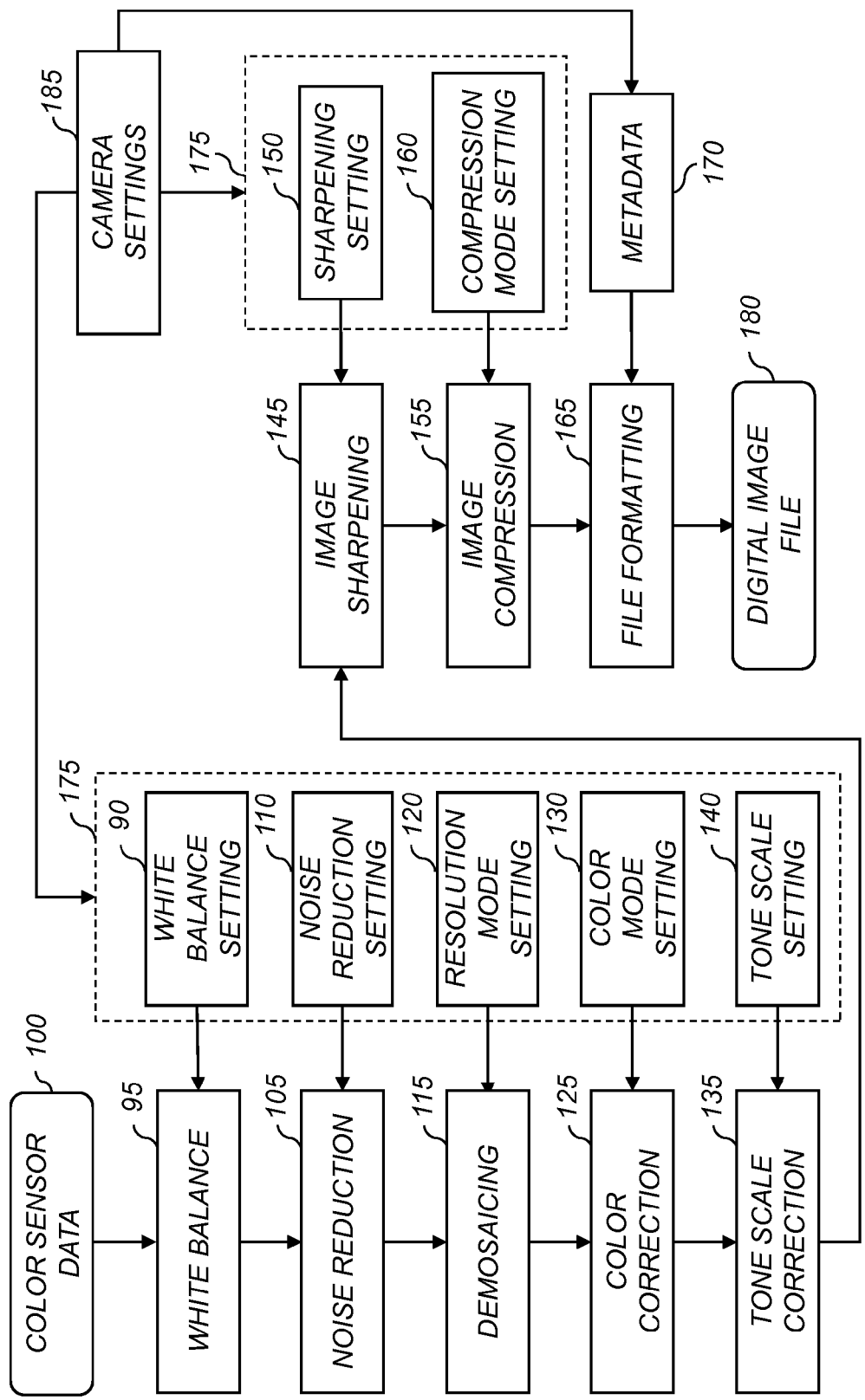
FIG. 2 is a flow diagram depicting typical image processing operations used to process digital images in a digital camera.

FIG. 2 is a flow diagram depicting image processing operations that can be performed by the processor 20 in the digital camera 10 (FIG. 1) in order to process color sensor data 100 from the first image sensor 14 (as output by the first ASP and A/D converter 16), or from the second image sensor 15 (as output by the second ASP and A/D converter 17). In some embodiments, the processing parameters used by the processor 20 to manipulate the color sensor data 100 for a particular digital image are determined by various photography mode settings 175, which are typically associated with photography modes that can be selected via the user controls 34, which enable the user to adjust various camera settings 185 in response to menus displayed on the image display 32.

The color sensor data 100 is manipulated by a white balance step 95. In some embodiments, this processing can be performed using the methods described in commonly-assigned U.S. Pat. No. 7,542,077 to Miki, entitled "White balance adjustment device and color identification device", the disclosure of which is herein incorporated by reference. The white balance can be adjusted in response to a white balance setting 90, which can be manually set by a user, or which can be automatically set by the camera.

The color image data is then manipulated by a noise reduction step 105 in order to reduce noise from the first image sensor 14 or the second image sensor 15. In some embodiments, this processing can be performed using the methods described in U.S. Pat. No. 6,934,056 to Gindele et al., entitled "Noise cleaning and interpolating sparsely populated color digital image using a variable noise cleaning kernel," the disclosure of which is herein incorporated by reference. In some embodiments, the level of noise reduction can be adjusted in response to a noise reduction setting 110, so that more filtering is performed at higher ISO exposure index setting.

The color image data is then manipulated by a demosaicing step 115, in order to provide red, green and blue (RGB) image data values at each pixel location. Algorithms for performing the demosaicing step 115 are commonly known as color filter array (CFA) interpolation algorithms or "deBayering" algorithms. In some embodiments of the present invention, the demosaicing step 115 can use the luminance CFA interpolation method described in U.S. Pat. No. 5,652,621, entitled "Adaptive color plane interpolation in single sensor color electronic camera," to Adams et al., the disclosure of which is incorporated herein by reference. The demosaicing step 115 can also use the chrominance CFA interpolation method described in U.S. Pat. No. 4,642,678, entitled "Signal processing method and apparatus for producing interpolated chrominance values in a sampled color image signal", to Cok, the disclosure of which is herein incorporated by reference.

In some embodiments, the user can select between different pixel resolution modes, so that the digital camera can produce a smaller size image file. Multiple pixel resolutions can be provided as described in commonly-assigned U.S. Pat. No. 5,493,335, entitled "Single sensor color camera with user selectable image record size," to Parulski et al., the disclosure of which is herein incorporated by reference. In some embodiments, a resolution mode setting 120 can be selected by the user to be full size (e.g. 3,000×2,000 pixels), medium size (e.g. 1,500×1000 pixels) or small size (750×500 pixels).

The color image data is color corrected in color correction step 125. In some embodiments, the color correction is provided using a 3×3 linear space color correction matrix, as described in U.S. Pat. No. 5,189,511, entitled "Method and apparatus for improving the color rendition of hardcopy images from electronic cameras" to Parulski, et al., the disclosure of which is incorporated herein by reference. In some embodiments, different user-selectable color modes can be provided by storing different color matrix coefficients in firmware memory 28 of the digital camera 10. For example, four different color modes can be provided, so that the color mode setting 130 is used to select one of the following color correction matrices:

Setting 1 (Normal Color Reproduction)

$$\begin{bmatrix} R_{out} \\ G_{out} \\ B_{out} \end{bmatrix} = \begin{bmatrix} 1.50 & -0.30 & -0.20 \\ -0.40 & 1.80 & -0.40 \\ -0.20 & -0.20 & 1.40 \end{bmatrix} \begin{bmatrix} R_{in} \\ G_{in} \\ B_{in} \end{bmatrix} \quad (1)$$

Setting 2 (Saturated Color Reproduction)

$$\begin{bmatrix} R_{out} \\ G_{out} \\ B_{out} \end{bmatrix} = \begin{bmatrix} 2.00 & -0.60 & -0.40 \\ -0.80 & 2.60 & -0.80 \\ -0.40 & -0.40 & 1.80 \end{bmatrix} \begin{bmatrix} R_{in} \\ G_{in} \\ B_{in} \end{bmatrix} \quad (2)$$

Setting 3 (De-Saturated Color Reproduction)

$$\begin{bmatrix} R_{out} \\ G_{out} \\ B_{out} \end{bmatrix} = \begin{bmatrix} 1.25 & -0.15 & -0.10 \\ -0.20 & 1.40 & -0.20 \\ -0.10 & -0.10 & 1.20 \end{bmatrix} \begin{bmatrix} R_{in} \\ G_{in} \\ B_{in} \end{bmatrix} \quad (3)$$

Setting 4 (Monochrome)

$$\begin{bmatrix} R_{out} \\ G_{out} \\ B_{out} \end{bmatrix} = \begin{bmatrix} 0.30 & 0.60 & 0.10 \\ 0.30 & 0.60 & 0.10 \\ 0.30 & 0.60 & 0.10 \end{bmatrix} \begin{bmatrix} R_{in} \\ G_{in} \\ B_{in} \end{bmatrix} \quad (4)$$

In other embodiments, a three-dimensional lookup table can be used to perform the color correction step 125.

The color image data is also manipulated by a tone scale correction step 135. In some embodiments, the tone scale correction step 135 can be performed using a one-dimensional look-up table as described in U.S. Pat. No. 5,189,511, cited earlier. In some embodiments, a plurality of tone scale correction look-up tables is stored in the firmware memory 28 in the digital camera 10. These can include look-up tables which provide a "normal" tone scale correction curve, a "high contrast" tone scale correction curve, and a "low contrast" tone scale correction curve. A user selected tone scale setting 140 is used by the processor 20 to determine which of the tone scale correction look-up tables to use when performing the tone scale correction step 135.

The color image data is also manipulated by an image sharpening step 145. In some embodiments, this can be provided using the methods described in U.S. Pat. No. 6,192,162 entitled "Edge enhancing colored digital images" to Hamilton, et al., the disclosure of which is incorporated herein by reference. In some embodiments, the user can select between various sharpening settings, including a "normal sharpness" setting, a "high sharpness" setting, and a "low sharpness" setting. In this example, the processor 20 uses one of three different edge boost multiplier values, for example 2.0 for "high sharpness", 1.0 for "normal sharpness", and 0.5 for "low sharpness" levels, responsive to a sharpening setting 150 selected by the user of the digital camera 10.

The color image data is also manipulated by an image compression step 155. In some embodiments, the image compression step 155 can be provided using the methods described in U.S. Pat. No. 4,774,574, entitled "Adaptive block transform image coding method and apparatus" to Daly et al., the disclosure of which is incorporated herein by reference. In some embodiments, the user can select between various compression settings. This can be implemented by storing a plurality of quantization tables, for example, three different tables, in the firmware memory 28 of the digital camera 10. These tables provide different quality levels and average file sizes for the compressed digital image file 180 to be stored in the image memory 30 of the digital camera 10. A user selected compression mode setting 160 is used by the processor 20 to select the particular quantization table to be used for the image compression step 155 for a particular image.

The compressed color image data is stored in a digital image file 180 using a file formatting step 165. The image file can include various metadata 170. Metadata 170 is any type of information that relates to the digital image, such as the model of the camera that captured the image, the size of the image, the date and time the image was captured, and various camera settings, such as the lens focal length, the exposure time and f-number of the lens, and whether or not the camera flash fired. In a preferred embodiment, all of this metadata 170 is stored using standardized tags within the well-known Exif-JPEG still image file format. In a preferred embodiment of the present invention, the metadata 170 includes information about various camera settings 185, including the photography mode settings 175.

The present invention will now be described with reference to FIG. 3, which illustrates a scenario in which a photographer 300 activates a composite mode of the digital camera 10. The digital camera 10 is held in a position such that a forward-facing capture unit 301 faces a scene 305 and a rear-facing capture unit 303 faces the photographer 300. With respect to the diagram of FIG. 2, the forward-facing capture unit 301 includes the forward-facing lens 4, the first adjustable aperture and adjustable shutter 6 and the first image sensor 14 and the rear-facing capture unit 303 includes the rear-facing lens 5, the second adjustable aperture and adjustable shutter 7 and the second image sensor 15.

With the digital camera 10 set to operate in the composite mode, the photographer 300 initiates a video capturing session that causes both the forward-facing capture unit 301 and the rear-facing capture unit 303 to simultaneously capture corresponding digital video sequences. One or more corresponding audio signals are also captured. In a preferred embodiment, a first audio signal is captured using forward-facing microphone 24 and a second audio signal is captured using rear-facing microphone 25.

The digital camera 10 then causes the processor 20 to implement a method for forming a composite digital video sequence 411 in accordance with the present invention. In a preferred embodiment, the processor 20 produces the composite digital video sequence 411 and stores it in the image memory 30, or provides it for real-time transmission using the wireless modem 50. The composite digital video sequence includes a facial video sequence of the photographer 300 that is inserted into the digital video sequence of the scene 305 according to composite instructions that are determined based on an automatic analysis of the captured digital video sequences and captured audio sequences. The details of a production of the composite instruction will be explained with reference to FIG. 4.

Figure 4:
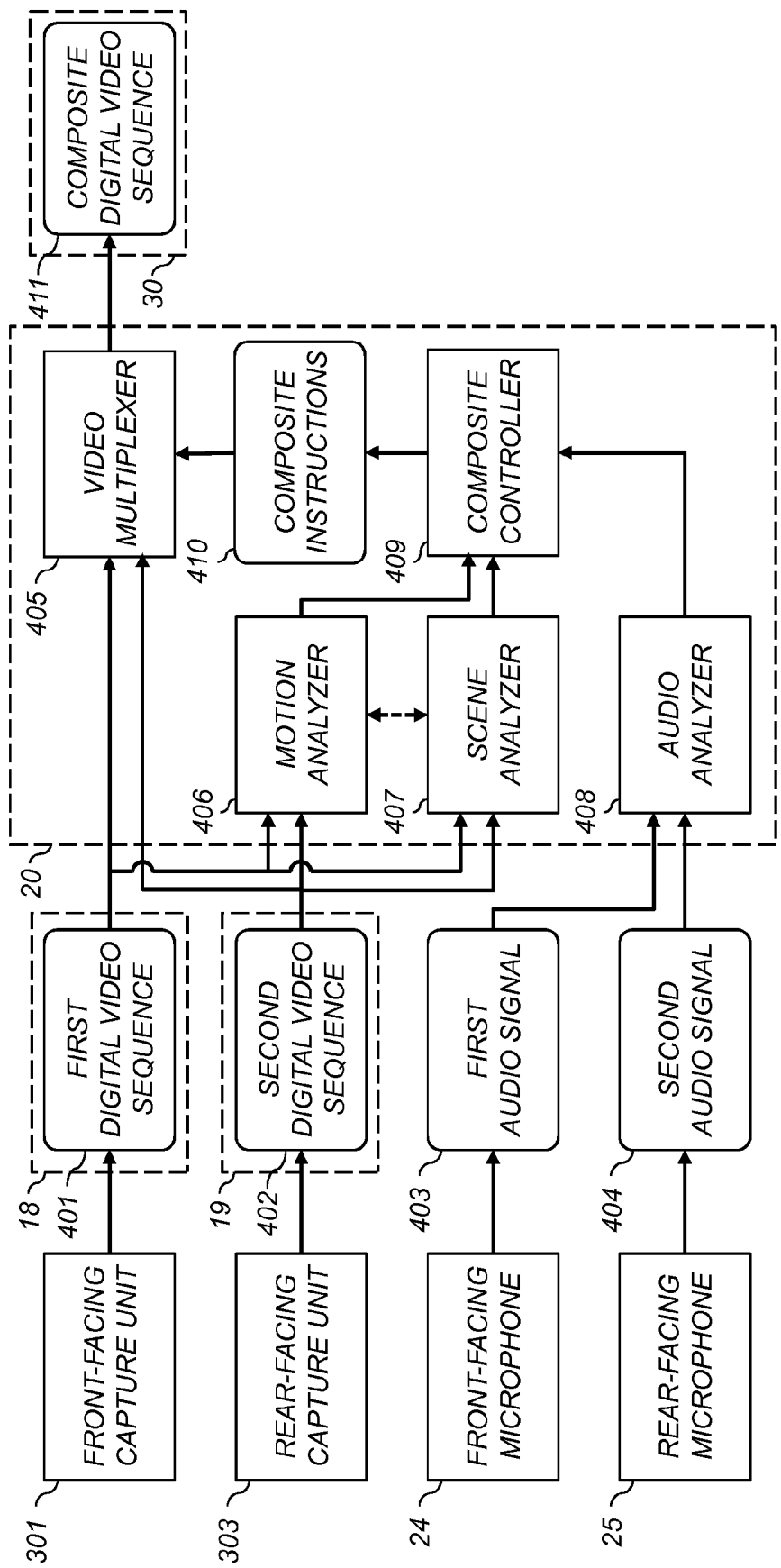
FIG. 4 is a block diagram showing components of a digital camera system for forming a composite video sequence.

FIG. 4 is a block diagram showing components of a video processing system for forming a composite digital video sequence 411 in accordance with the present invention. The forward-facing capture unit 301 is controlled (according to signals provided by the timing generator 12 (FIG. 1)) to capture a first digital video sequence 401, which is stored in first buffer memory 18. Likewise, the forward-facing capture unit 301 is controlled to capture a second digital video sequence 402, which is stored in second buffer memory 19. Similarly, the forward-facing microphone 24 is controlled to capture a first audio signal 403, and the rear-facing microphone 25 is controlled to capture a second audio signal 404.

Figure 3:
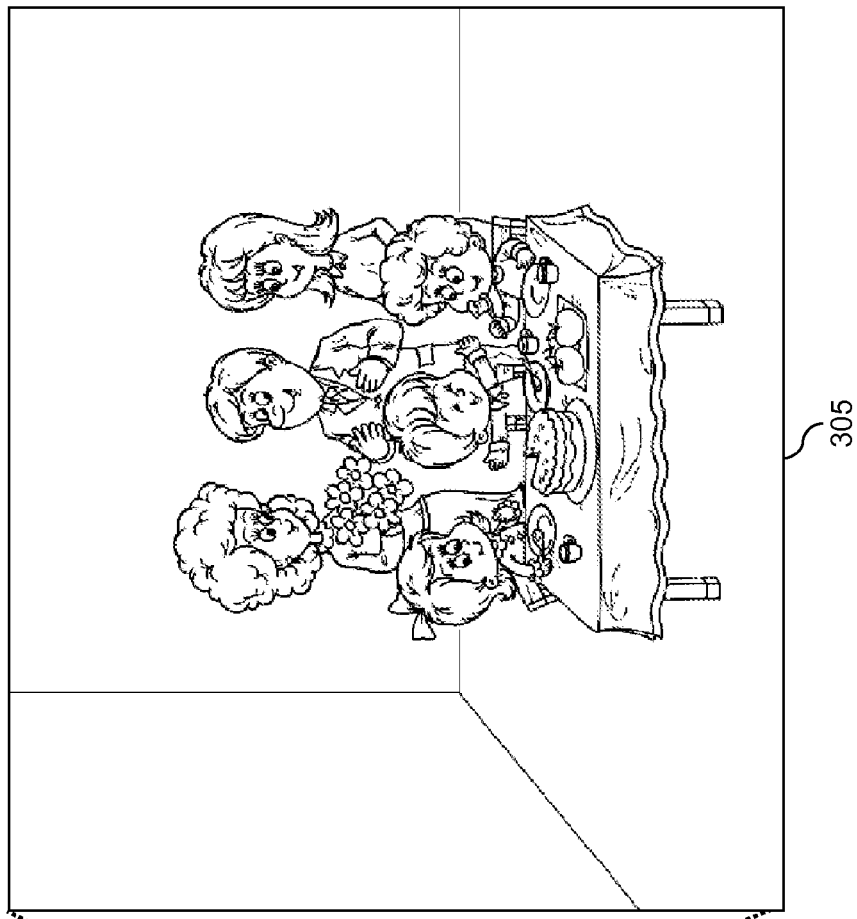
FIG. 3 is a diagram illustrating the use of a digital camera having a front-facing capture unit and a rear-facing capture unit to provide a composite video sequence.
Figure 3:
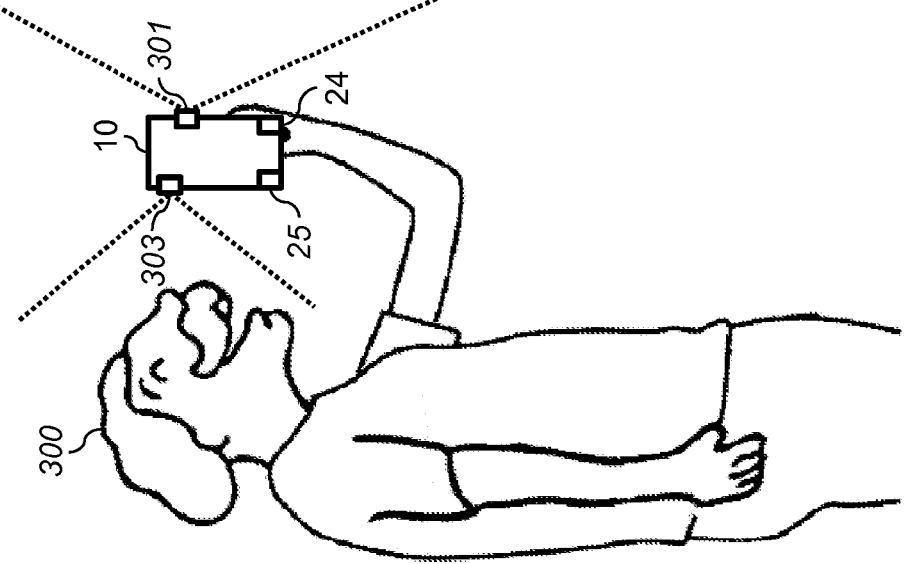

In accordance with the scenario discussed relative to FIG. 3, the first digital video sequence 401 is of the scene 305, and the second digital video sequence 402 includes the face of the photographer 300. Similarly, the first audio signal 403 captures sounds coming from the direction of the scene 305, and the second audio signal 404 captures sounds coming from the direction of the photographer 300.

The first digital video sequence 401 and the second digital video sequence 402 are input to a motion analyzer 406 and a scene analyzer 407. The first audio signal 403 and the second audio signal 404 are input to audio analyzer 408. In a preferred embodiment, the functions of the motion analyzer 406, the scene analyzer 407 and the audio analyzer are provided by the processor 20 in the digital camera 10. The motion analyzer 406, the scene analyzer 407, and the audio analyzer 408 analyze motion characteristics, scene characteristics, and audio characteristics, respectively, and provide the analysis results to a composite controller 409. In some embodiments, the motion analyzer 406 and the scene analyzer 407 may share results with each other, or may include common analysis operations. The composite controller 409 determines how the first digital video sequence 401 and the second digital video sequence 402 should be combined, and sends corresponding composite instructions 410 to a video multiplexer 405. The video multiplexer 405 forms a composite digital video sequence 411 by combining the first digital video sequence 401 and the second digital video sequence 402 and stores the composite digital video sequence 411 to the image memory 30. In some embodiments, one or both of the first digital video sequence 401 and the second digital video sequence 402 can be stored in the image memory 30 in addition to the composite digital video sequence 411. The decision of which digital video sequences that the user desires to store in the image memory 30 can be a user selectable option.

In some embodiments, a first audio signal 403 from the forward-facing microphone 24 and the second audio signal 404 from the rear-facing microphone 25 can be provided to an audio analyzer 408. Information determined by the audio analyzer 408 can be provided to the composite controller 409 to be used in the determination of the composite instructions 410. For example, speech recognition can be used to analyze the words spoken by the photographer 300 to determine appropriate captions to be included in the composite digital video sequence 411. Techniques for recognizing the speech in the audio signal are well known in the art and, therefore, are not described herein.

In some embodiments, user controls 34 (FIG. 1) are provided on the digital camera 10 enabling the user to selectively activate or deactivate the composite imaging mode of the present invention to determine whether or not the composite digital video sequence 411 of FIG. 4 should be formed. In some embodiments, an option can be provided where the composite digital video sequence 411 is automatically formed when a predefined criterion is satisfied. For example, the second digital video sequence 402 can be analyzed using a face recognition algorithm to determine whether the photographer 300 (FIG. 3) matches a face stored in a predefined face database (e.g., the face database can be stored in the firmware memory 28 and can be populated during a training process with facial information for family members). The predefined criterion can be defined such that if the face of the photographer 300 is recognized in the second digital video sequence 402, the composite imaging mode can automatically be activated. If the face of the photographer 300 is not recognized, the composite imaging mode is not used. (This could correspond, for example, to the case where the family asked someone to capture a video of the entire family.) Face recognition techniques for recognizing a face in a video sequence are well-known in the art, and therefore are not described herein.

Figure 5:
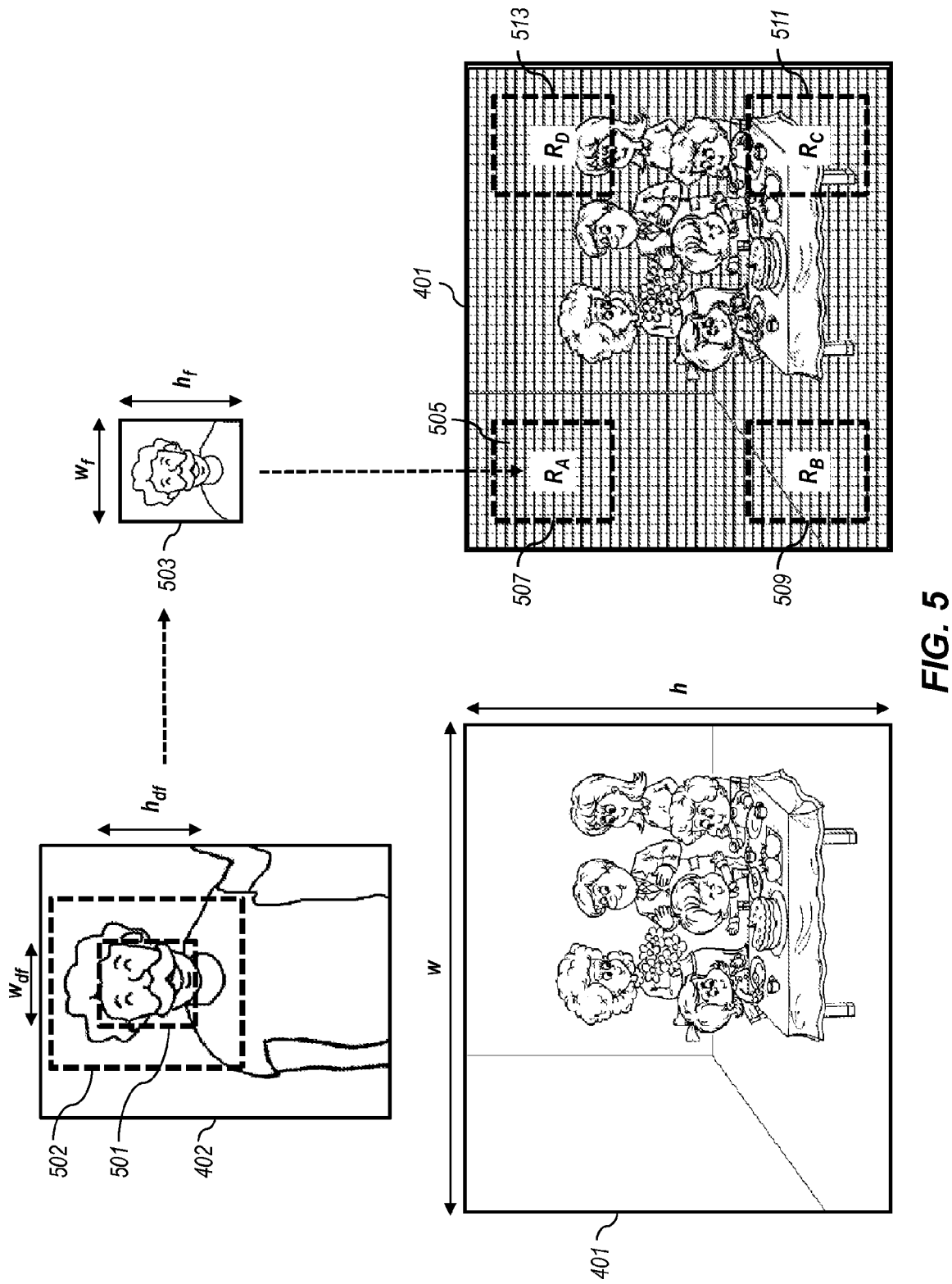
FIG. 5 is a diagram illustrating the formation of a facial video sequence, and the selection of a low-interest image region.

Additional details of the present invention will now be described with reference to FIG. 5. First digital video sequence 401 is captured of the scene using the forward-facing capture unit 301 (FIG. 4) and second digital video sequence 402 is captured using the rear-facing capture unit 303 (FIG. 4). The scene analyzer 407 (FIG. 4) analyzes the second digital video sequence 402 using a face detection algorithm and identifies detected face 501. Face detection algorithms are well-known in the art and any such face detection algorithm can be used in accordance with the present invention. In some embodiments, the detected face 501 is analyzed using a face recognition algorithm to determine whether the detected face corresponds to a known face stored in the face database stored in the firmware memory 28.

A facial image region 502 is defined centered on the detected face 501. If there are multiple detected faces 501, the facial image region 502 is defined to include the largest detected face 501 (or to the largest detected face 501 corresponding to a person in the face database).

The motion analyzer 406 (FIG. 4) tracks the detected face 501 throughout the second digital video sequence 402, and the size and the position of the facial image region 502 is adjusted accordingly for each video frame as the relative position of the photographer 300 (FIG. 3) and the digital camera 10 (FIG. 3) change. The tracking of the detected face 501 can be achieved using any method known in the art such as the well-known mean-shift face tracking algorithm described by Collins in the article entitled "Mean-shift Blob Tracking through Scale Space" (IEEE Computer Vision and Pattern Recognition, pp. 234-240, 2003), which is incorporated herein by reference.

In a preferred embodiment, the scene analyzer 407 and the motion analyzer 406 simultaneously detect and track faces. Techniques for simultaneous detection and tracking of the faces are well-known in the art (e.g., see Verma et al., "Face detection and tracking in a video by propagating detection probabilities," IEEE Transactions on Pattern Analysis and Machine Intelligence, pp. 1215-1228, 2003, which is incorporated herein by reference) and, therefore, are not described herein.

In a preferred embodiment, the motion analyzer 406 smoothes the path of the tracked detected face 501 to avoid abrupt change of the size and center of the facial image region 502. Techniques for smoothing the path are well known in the art and, therefore, are not described herein.

In a preferred embodiment, the center of the facial image region 502 is the center of the detected face 501, and the size of tracked facial image region is 4× as large as the size of the detected face 501 (2× larger in both the width and the height), while preserving the aspect ratio of the detected face 501. The height and width of the detected face 501 are denoted to $h_{df}$ and $w_{df}$, respectively. The height and width of the facial image region 502 are therefore given as $2 \times h_{df}$ and $2 \times w_{df}$, respectively.

In a preferred embodiment, each facial image region 502 for each video frame is resized to a predefined size T while preserving the aspect ratio to provide a facial video sequence 503. The aspect ratio $R_{h/w}$ of the detected face 501 is given as:

$$R_{h/w} = h_{df}/w_{df} \quad (5)$$

(Preferably, the aspect ratio $R_{h/w}$ of the tracked detected face 501 is constrained to be constant for all of the video frames in the second digital video sequence 402.) The size T is preferably defined to be a predefined fraction of the size of the first digital video sequence 401. In a preferred embodiment, T is given as:

$$T = (h/4) \times (w/4) \quad (6)$$

where h and w are the height and the width of the first digital video sequence 401, respectively.

The height $h_f$ and width $w_f$ of the resized video frames for the facial video sequence 503 can be calculated using the following equations:

$$h_f = (T \times R_{h/w})^{1/2} \quad (7)$$

$$w_f = (T/R_{h/w})^{1/2} \quad (8)$$

Using the described approach, the size and position of the face in the facial video sequence 503 is always the same regardless of any variability in the distance between the photographer 300 and the digital camera 10 and the position of the detected face 501 within the second digital video sequence 402.

In an alternate embodiment, the center of the facial image region 502 is set to be the center of the tracked detected face 501, but the size of facial image region 502 is fixed to a size 4× as large as the average size of the detected face 501 for first 10 video frames in the second digital video sequence 402. With the approach, the size of the face in the facial video sequence 503 varies according to any variability in the distance between the photographer 300 and the digital camera 10.

In another alternate embodiment, both the size and the center of the facial image region 502 is determined relative to the average size and average center of the detected face 501 for the first 10 video frames in the second digital video sequence 402. With this approach, the size and center of the face in the facial video sequence 503 vary according to any variability in the distance between the photographer 300 and the digital camera 10 and any variability in the position of the center of the photographer 300.

To form a composite video image, the extracted facial video sequence 503 will be overlaid on the first digital video sequence 401. However, it is important that the overlaid facial video sequence 503 not cover any important image content in the first digital video sequence 401. In a preferred embodiment, an appropriate location to insert the facial video sequence 503 is determined by automatically analyzing the first digital video sequence 401 to identify a spatial image region having image content of low interest. To identify such an image region, a suitability score is computed for a set of candidate image regions. The suitability score can be determined using any suitable method known in the art. In a preferred embodiment, the suitability score is determined by evaluating image attributes such as image motion, image texture, image saliency and the presence of faces. It will be obvious to one skilled in the art that the suitability score can also incorporate other image attributes such as image colorfulness and the presence of recognized objects.

Generally, areas of the first digital video sequence 401 having large amounts of independent motion caused by moving objects rather than camera motion will be less suitable for inserting the facial video sequence 503. In a preferred embodiment, the motion analyzer 406 (FIG. 4) analyzes the first digital video sequence 401 to determine "optical flow" as a function of position, which is used as a local motion score. The optical flow is a measure of the motion of corresponding image features between video frames. The magnitude of the motion at pixel location x is used for the local motion score and is denoted by $m_x$, where $m_x$ is normalized to range from 0 to 1. Techniques for estimating optical flow and independent motion are well known in the art (e.g., see Lucas et al., "An iterative image registration technique with an application to stereo vision," Proc. Imaging Understanding Workshop, pages 121-130, 1981; Shi et al., "Good features to track," Proc. IEEE Conference on Computer Vision and Pattern Recognition, pp. 593-600, 1994; and Clarke et al., "Detection and tracking of independent motion," Image and Vision Computing, pp. 565-572, 1996, which are each incorporated herein by reference) and, therefore, are not described herein.

Generally, areas of the first digital video sequence 401 having higher levels of texture will be less suitable for inserting the facial video sequence 503. In a preferred embodiment, the scene analyzer 407 (FIG. 4) analyzes the first digital video sequence 401 to determine a local texture score providing an indication of the amount of texture in a local region. The local texture score at pixel location x is denoted by $t_x$, where $t_x$ is normalized to range from 0 to 1. Techniques for estimating a texture score are known in the art (e.g., see Pass et al., "Comparing images using joint histograms," Multimedia Systems, pp. 234-240, 1999, which is incorporated herein by reference) and, therefore, are not described herein.

Image saliency relates to the characteristic of prominence or importance of features in an image. Generally, areas of the first digital video sequence 401 having higher levels of image saliency will be less suitable for inserting the facial video sequence 503. In a preferred embodiment, the scene analyzer 407 analyzes the first digital video sequence 401 to determine a local saliency score providing an indication of importance of a local region. The local saliency score at pixel location x is denoted by $s_x$, where $s_x$ is normalized to range from 0 to 1. Techniques for estimating a saliency score are well-known in the art (e.g., see Itti et al., "Computational modeling of visual attention," Nature Reviews: Neuroscience, pp. 194-203, 2001, which is incorporated herein by reference) and, therefore, are not described herein.

Generally, local regions of the first digital video sequence 401 containing a known face are least suitable for embedding the facial video sequence 503, and local regions containing unknown faces are less suitable for embedding the facial video sequence 503 than local regions containing no face. In a preferred embodiment, scene analyzer 407 detects and recognizes faces in the first digital video sequence 401 to determine a facial presence score. The facial presence score at pixel location x with respect to face detection and recognition is denoted by $f_x$, where $f_x$ is normalized to range from 0 to 1. In a preferred embodiment, the facial presence score is set to 1.0 in an area where a recognized face is present, is set to 0.5 in an area where an unrecognized face is detected, and is set to 0.0 elsewhere. Techniques for detecting and recognizing faces are well-known in the art and, therefore, are not described herein. One such method for detecting faces that can be used in accordance with the present invention is described in the aforementioned article by Verma et al. entitled "Face detection and tracking in a video by propagating detection probabilities."

The composite controller 409 (FIG. 4) combines the various individual attribute scores that were determined by the motion analyzer 406 and the scene analyzer 407 to produce a suitability score $v_x$ at pixel location x. In a preferred embodiment, the suitability score $v_x$ is determined by forming a weighted combination of the individual attribute scores:

$$v_x = 1 - (w_f \times f_x + w_s \times s_x + w_t \times t_x + w_m \times m_x) \qquad (9)$$

where $w_f$, $w_s$, $w_t$, and $w_m$ are constants that are used to weight the relative contributions of $f_x$, $s_x$, $t_x$, and $m_x$. In a preferred embodiment, $w_f=0.4$, $w_s=0.2$, $w_t=0.1$ and $w_m=0.3$. To determine the suitability of an image region for inserting the facial video sequence 503, an average suitability score is determined across all of the pixels in the image region. Higher average suitability scores will correspond to image regions that are more suitable for inserting the facial video sequence 503.

In a preferred embodiment, the image region having the highest average suitability score is selected to be the most suitable location for the insertion of the facial video sequence 503. In some embodiments, a constraint can be placed on the selection process such that any image regions containing recognized faces are deemed to be unsuitable, even if they happen to have the highest average suitability score.

For efficiency purposes, in a preferred embodiment a predefined set of candidate image regions are defined for which the average suitability score are determined by the composite controller 409. For example, FIG. 5 shows for candidate image regions located near the four corners of the first digital video sequence 401. A first candidate image region 507 is located in the upper-left portion of the first digital video sequence 401 and is denoted by $R_A$; a second candidate image region 509 is located in the lower-left portion of the first digital video sequence 401 and is denoted by $R_B$; a third candidate image region 511 is located in the lower-right portion of the first digital video sequence 401 and is denoted by $R_C$; and a fourth candidate image region 513 is located in the upper-right portion of the first digital video sequence 401 and is denoted by $R_D$. Each of the candidate image regions 507, 509, 511 and 513 have a height of $h_f$ and the width of $w_f$, which is the size of the facial video sequence 503. The composite controller 409 computes the average suitability score for each of the four candidate image regions 507, 509, 511 and 513 selects the one having the highest average suitability score as selected image region 505, which is denoted by $R_S$. In this example, the first candidate image region 507 is selected for the selected image region 505. In other embodiments, a larger number of image regions can be evaluated as candidates. In the limit, the average suitability score can be determined for every possible position.

In other embodiments, the identification of the selected image region 505 can be formulated as an optimization problem where the goal is to find a largest possible image region with largest possible average suitability score within the image region. A suitable optimization criterion can be formulated using any method known in the art. Methods for formulating and solving optimization problems are well-known to those skilled in the art; hence details are not described herein.

In some embodiments, the selected image region 505 is determined by evaluating one or more video frames near the beginning of the first digital video sequence 401. (For cases where multiple video frames are evaluated, the average suitability scores can be determined for each video frame, and then averaged to determine overall average suitability scores.) In this case, once the selected image region 505 is selected, it is used throughout the entire video, whether or not high interest image content may overlap this image region in later video frames.

In other embodiments, the average suitability scores are recomputed periodically as the first digital video sequence 401 is captured and the selected image region 505 can be adjusted if appropriate. In such cases, it may be desirable to only switch the selected image region 505 to a new location if the average suitability score difference exceeds a predefined threshold to prevent the selected image region 505 from jumping around too often when there are small changes in the image content.

In other embodiments, the selected image region 505 is chosen by considering the entire first digital video sequence 401 to identify a single image region which is most suitable taking into account the changes in the scene content throughout the video. This approach can only be used when the process of forming the composite digital video sequence 411 (FIG. 4) is performed as a post processing operation after the video capture process is complete.

Once the selected image region 505, the composite digital video sequence 411 is formed by inserting the extracted facial video sequence 503 into the selected image region 505 of the first digital video sequence 401. The composite digital video sequence 411 can be formed using a variety of different methods. In a preferred embodiment, a preferred compositing method can be selected by the user from plurality of different user selectable compositing modes using appropriate user controls 34 (FIG. 1).

Figure 6:
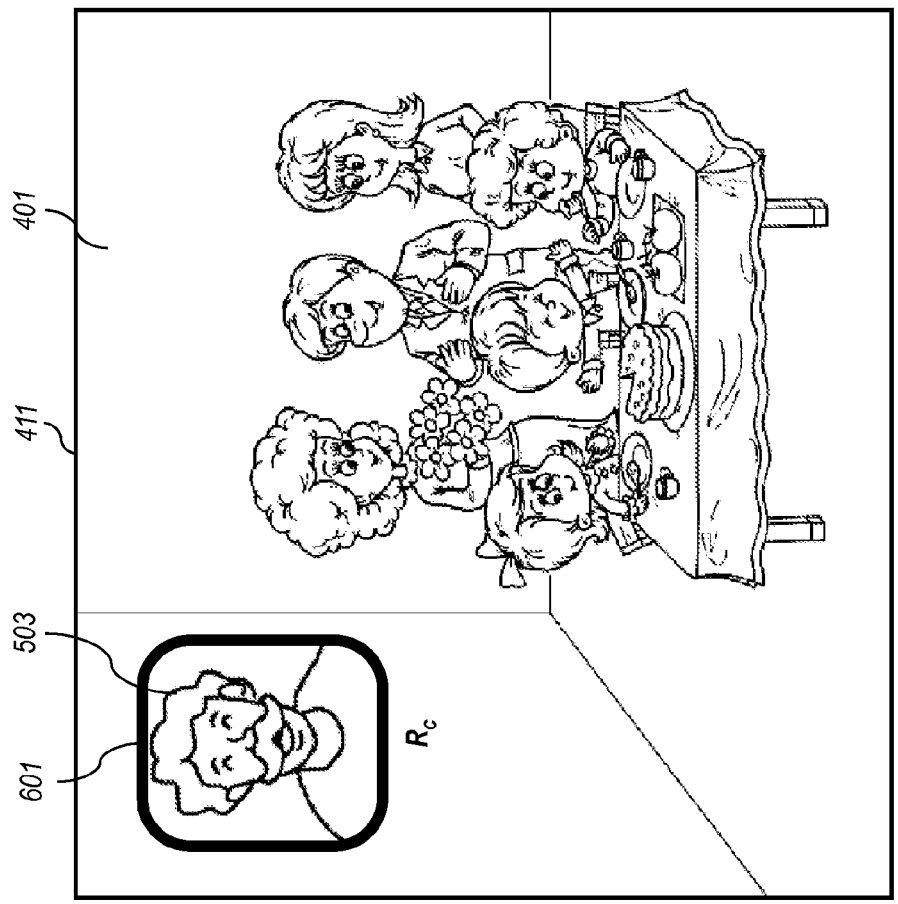
FIG. 6 is a diagram illustrating the formation of a composite digital video sequence using a rounded rectangular frame element.
Figure 6:
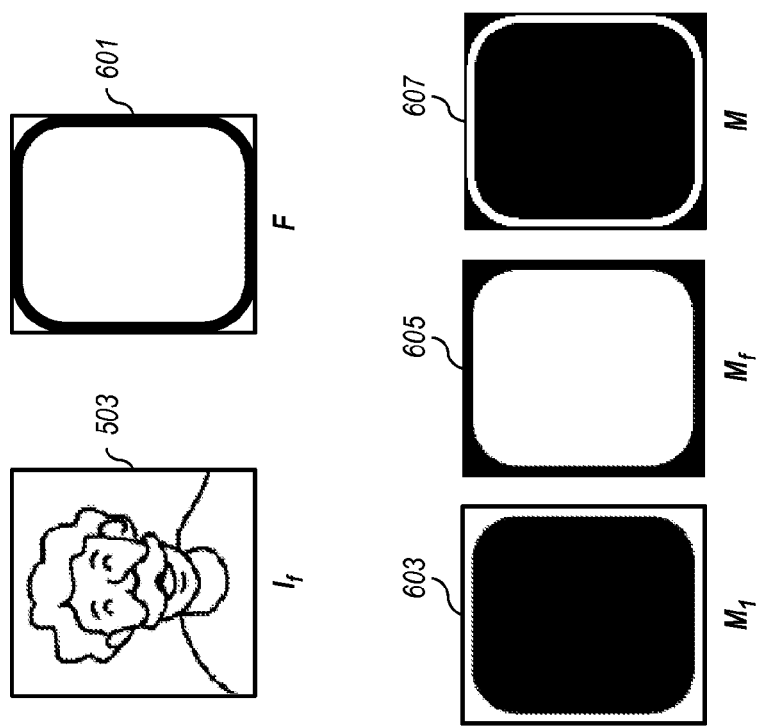

FIG. 6 depicts an example of a user selectable compositing mode that can be used for compositing the facial video sequence 503 (denoted by $I_f$) and the first digital video sequence 401 (denoted by $I_1$) using a rounded rectangular frame 601 (denoted by F). A set of blending masks are defined that are used to weight the different image elements during the compositing process. A first digital video sequence blending mask 603 is denoted by $M_1$; a facial video sequence blending mask 605 is denoted by $M_f$; and a rounded rectangle frame blending mask 607 is denoted by M. White regions in the masks are ones and black regions in the masks are zeros. The composite digital video sequence 411 can be computed by replacing the pixels in the selected image region 505 ($R_c$) by a composited image region $R_c$ computed as:

$$R_c = R_s \otimes M_1 + I_f \otimes M_f + F \otimes M \qquad (10)$$

where ⊗ is an operator indicating an entry-wise multiplication of arrays.

In the example of FIG. 6, the masks ($M_1$, $M_f$ and M) are binary masks (having pixel values that are either zero or one). In other embodiments, the masks can include gradually varying values ranging from 0 to 1 to control blending. The person who is skilled in the art will understand that the mask values can be controlled to produce various blending effects. For example, the mask values can be adjusted to provide blended transitions between the first digital video sequence 401 and the frame 601 and the facial video sequence 503, or to provide a translucency effect where the first digital video sequence 401 is partially visible through the facial video sequence 503 or the frame 601.

Figure 7:
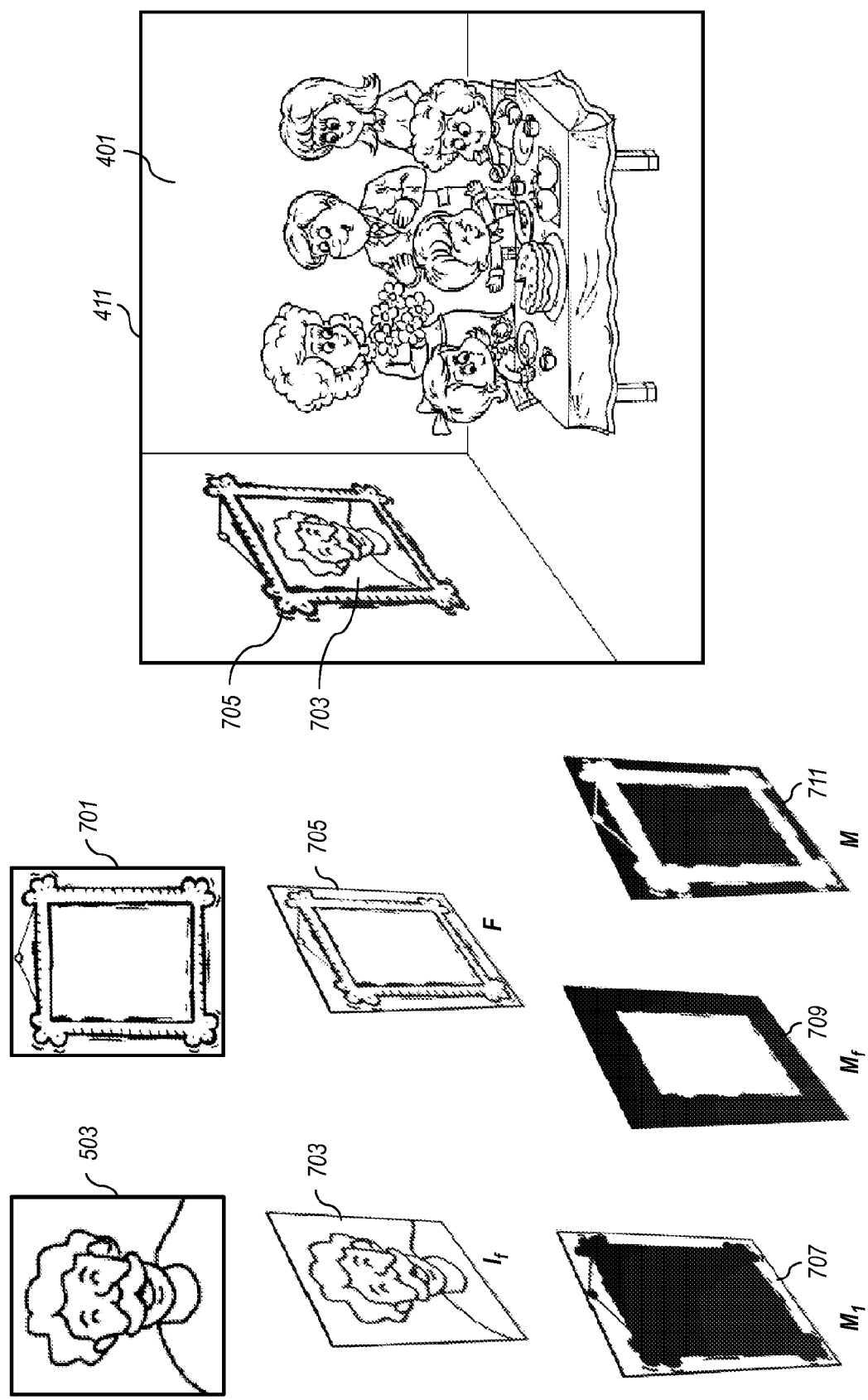
FIG. 7 is a diagram illustrating the formation of composite digital video sequence using a picture frame element.

In other embodiments, the facial video sequence 503 can be inserted using other ways that provide entertainment value. For example, FIG. 7 depicts another example of a user selectable compositing mode for compositing the facial video sequence 503 and the first digital video sequence 401 using a picture frame border 701, to provide a composite digital video sequence 411 having the appearance that the photographer is in a picture frame hanging on a wall in the scene. According to this compositing mode, the scene analyzer 407 (FIG. 4) analyzes the first digital video sequence 401 to determine vanishing points around the selected image region 505 ($R_s$). Techniques for detecting vanishing points are well known in the art (e.g., see Tardif et al., "Non-iterative approach for fast and accurate vanishing point detection," Proc. IEEE International Conference on Computer Vision, pp. 1250-1257, 2009, which is incorporated herein by reference), hence, are not described herein. The detected vanishing points are used to warp the facial video sequence 503 and the picture frame border 701 to create the appearance of a picture hanging on a wall in the scene. In this mode, the composite controller 409 (FIG. 4) applies a perspective warping transform to the facial video sequence 503 and the picture frame border 701 according to the determined vanishing points, then produces a warped facial video sequence 703 and a picture frame border 705, respectively. Similarly, a warped first digital video sequence blending mask 707, a warped facial video sequence blending mask 709, and a warped picture frame blending mask 711 are also determined using the same perspective warping transform. Then the composite digital video sequence 411 can be determined using Eq. (10).

Figure 8:
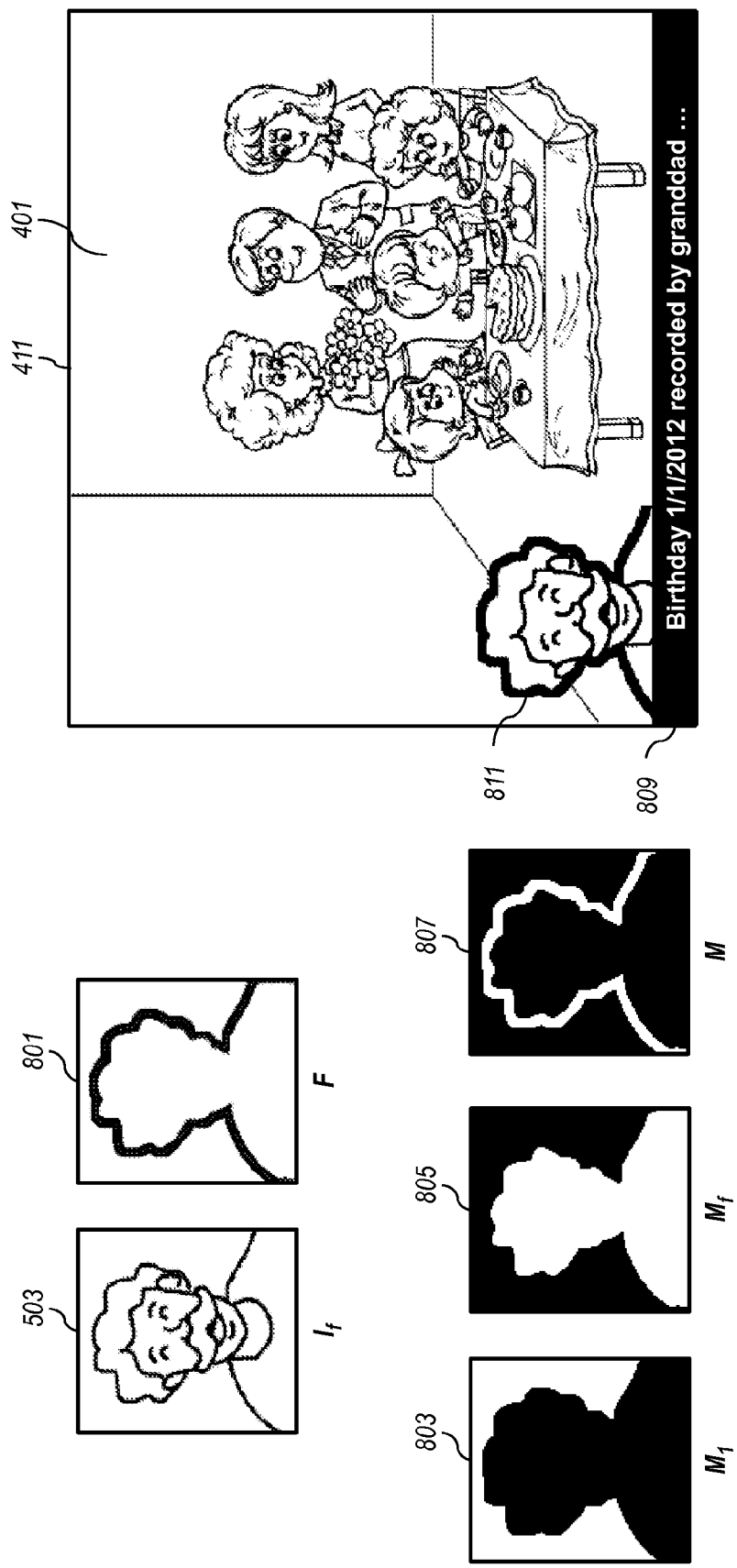
FIG. 8 is a diagram illustrating the composite digital video sequence using a segmentation frame element.

FIG. 8 depicts another example of a user selectable compositing mode for compositing the facial video sequence 503 and the first digital video sequence 401 using a segmentation boundary frame 801. The segmentation boundary frame 801 is determined by analyzing the facial video sequence 503 to determine a boundary around the head of the photographer using any appropriate image segmentation technique known in the art. Since the location of the boundary will generally vary between each video frame, the segmentation boundary frame 801 is determined for each video frame. A first digital video sequence blending mask 803, a facial video sequence blending mask 805, and a segmentation boundary frame blending mask 807 are also determined for each video frame based on the segmentation boundary frame 801. The composite digital video sequence 411 is then computed by applying Eq. (10) to insert segmented facial video sequence 811.

In some embodiments, a caption 809 can also be added on the bottom of the composite digital video sequence 411 (or at some other appropriate location). Information such as the location of the event determined using the GPS receiver 31, the event time by a clock in the processor 20, the identities of recognized faces in the first digital video sequence 401 determined by the scene analyzer 407, the identity of the recognized face of the photographer 300 in the facial video sequence 503 determined by the scene analyzer 407, and recognized speech determined by the audio analyzer 408 can be added automatically to the caption 809.

As can be seen in FIGS. 6, 7, and 8, the composite controller 409 allows various kinds of compositing modes and frame boundaries to be used for the formation of the composite digital video sequence 411. A wide variety of other compositing modes can also be used. For example, a frame boundary may be an animated character of animals, celebrities, or cartoons where the face regions of them are to be filled by the facial video sequence 503. The person skilled in the art can produce various compositing results using the methods described here by defining appropriate frames and corresponding blending masks for the frame, the first digital video sequence 401, and the facial video sequence 503.

In some embodiments, the facial video sequence 503 can be inserted into the first digital video sequence 401 without using a frame. In some cases there can be a hard boundary around the edge of the inserted facial video sequence 503. In other cases, a blending mask can be defined that gradually blends the facial video sequence 503 into the first digital video sequence.

Returning to a discussion of FIG. 4, the video multiplexer 405 also provides an output audio signal to be used for the composite digital video sequence 411. In some embodiments, the first audio signal 403 or the second audio signal 404 can be used directly for the output audio signal. In other embodiments, the output audio signal can be a composite audio signal $a_c$ formed by mixing the first audio signal 403 and the second audio signal 404 using appropriate audio blending weights:

$$a_c = w_1 a_1 + w_2 a_2 \qquad (11)$$

where $a_1$ is the first audio signal 403, $a_2$ is the second audio signal 404, $w_1$ is an audio blending weight for $a_1$, $w_2$ and is an audio blending weight for $a_2$.

In some embodiments, the audio blending weights $w_1$ and $w_2$ can be predefined constants. In other embodiments, they can be determined based on an analysis of the first audio signal 403 and the second audio signal 404. For example, the audio analyzer 408 can analyze the second audio signal 404 contains speech. If there is speech signal in the second audio signal 404, $w_2$ is set to a larger value than $w_1$ (e.g., $w_1=0.2$ and $w_2=0.8$). If there is no speech signal in the second audio signal 404, $w_2$ is set to a smaller value than $w_1$ (e.g., $w_1=0.8$ and $w_2=0.2$). The audio blending weights can be gradually faded from one level to another as the photographer transitions between speaking and not speaking to prevent objectionable abrupt changes. Techniques for detecting the speech in the audio signal are well known in the art and, therefore, are not described herein.

Figure 9:
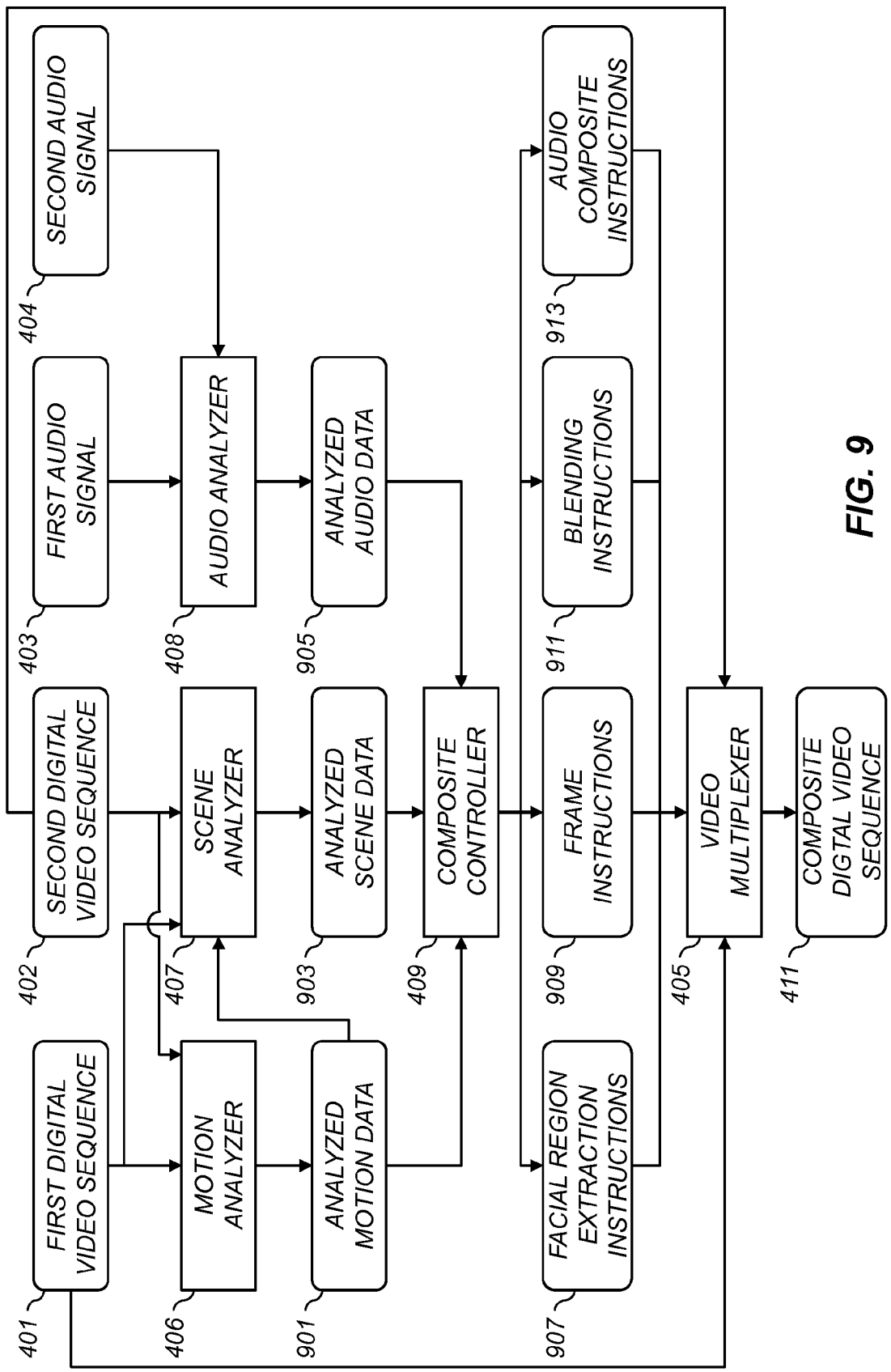
FIG. 9 is a flow chart illustrating a method for forming a composite digital video sequence according to an embodiment of the present invention.

FIG. 9 shows a flow chart summarizing the formation of the composite digital video sequence 411 using the system of FIG. 4 according to a preferred embodiment. The first digital video sequence 401 and the second digital video sequence 402 are input to the motion analyzer 406 and the scene analyzer 407. The motion analyzer 406 produces analyzed motion data 901 and the scene analyzer 407 produces analyzed scene data 903. The analyzed scene data 903 includes face tracking information that was determined with the help of the analyzed motion data 901.

The analyzed motion data 901 and the analyzed scene data 903 are input to the composite controller 409. The composite controller 409 produces facial region extraction instructions 907 (e.g., information about the region in the second digital video sequence 402 that should be extracted to form the facial video sequence 503), frame instructions 909 (e.g., information specifying characteristics of the frame F), and blending instructions 911 (e.g., information specifying the blending masks $M_1$, $M_f$ and M), which are input to the video multiplexer 405 to be used during the formation of the composite video sequence.

The first audio signal 403 and the second audio signal 404 are input to the audio analyzer 408. The audio analyzer 408 produces analyzed audio data 905, which is also input to the composite controller 409. The composite controller 409 then produces audio composite instructions 913 (e.g., information specifying the audio blending weights $w_1$ and $w_2$).

The video multiplexer 405 produces the composite digital video sequence 411 using the facial region extraction instructions 907, the frame instructions 909, the blending instructions 911, and the audio composite instructions 913. The composite digital video sequence 411 is then stored in a processor accessible memory, or transmitted to another device over wireless network.

An embodiment of the present invention will now be described with reference to FIG. 10, which illustrates a network compositing scenario in which a first photographer 1003 with a first digital camera 1007 and a second photographer 1005 with a second digital camera 1009 activate a dual camera compositing mode wherein the digital cameras exchange data with each other using the wireless network 58. The first digital camera 1007 includes a first forward-facing capture unit 1011, a first rear-facing capture unit 1015, a first forward-facing microphone 1024, a first rear-facing microphone 1025 and a first wireless modem 1019 for communicating across the wireless network 58. Likewise, the second digital camera 1009 includes a second forward-facing capture unit 1013, a second rear-facing capture unit 1017, a second forward-facing microphone 1026, a second rear-facing microphone 1027 and a second wireless modem 1021. This approach can be useful in various scenarios such as when the second photographer 1005 has a better vantage point of the scene 305 than the first photographer 1003, but the first photographer 1003 desires to make a composite video including his face.

For the dual camera compositing mode, either the first digital camera 1007 or the second digital camera 1009 can serve as a host. For example, if the first digital camera 1007 is the host, then the second digital camera 1009 can send a connection request signal to the first digital camera 1007. Then the first photographer 1003 can use appropriate user controls 34 on the first digital camera 1007 to permit the connection. Network connection is then established between the first digital camera 1007 and the second digital camera 1009.

In this example, the second digital camera 1009 is held in a position such that the second forward-facing capture unit 1013 faces the scene 305 and captures a corresponding first digital video sequence 401, and the first digital camera 1007 is held in a position such that the first rear-facing capture unit 1015 captures a facial video sequence 503 including the first photographer 1003. Either of the first photographer 1003 or the second photographer 1005 can initiate a video capturing session that enables transmission of the first digital video sequence 401 captured of the scene 305 on the second digital camera 1009 to the first digital camera 1007 over the wireless network 58. The processor 20 in the first digital camera 1007 is then used to form the composite digital video sequence 411 in accordance with the method of the present invention. The composite digital video sequence 411 is formed by combining the facial video sequence 503 of the first photographer 1003 captured using the first rear-facing capture unit 1015 and a first digital video sequence 401 of the scene 305 captured using the second forward-facing capture unit 1013. As described earlier, the composite digital video sequence 411 is formed according to composite instructions determined based on automatic analysis of the motion, scene, and audio characteristics of the capture digital videos.

The resulting composite digital video sequence 411 is stored in the image memory 30 of the first digital camera 1007. Optionally, the composite digital video sequence 411 can be transmitted to another device using the first wireless modem 1019. For example, the composite digital video sequence 411 can be transmitted to the second digital camera 1009, to an on-line social network, or to some other network capable digital device.

In other embodiments, the facial video sequence 503 of the first photographer 1003 captured using the first rear-facing capture unit 1015 is transmitted from the first digital camera 1007 to the second digital camera 1009 over the wireless network 58. In the case, the processor 20 in the second digital camera 1009 is used to perform the method for forming the composite digital video sequence 411. The resulting composite digital video sequence 411 is then stored in the image memory 30 of the second digital camera 1009, and can optionally be transmitted to another device using the second wireless modem 1021.

Figure 10:
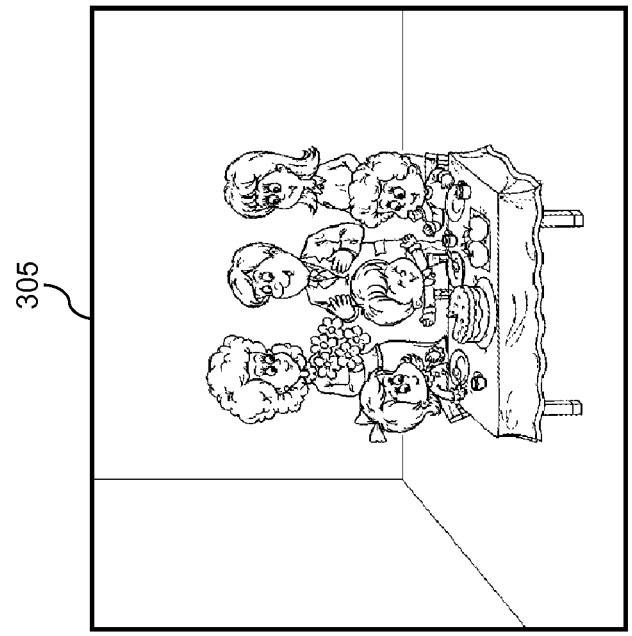
FIG. 10 is a diagram illustrating the use of two digital cameras connected using a wireless network to produce composite video sequences according to an alternate embodiment.
Figure 10:
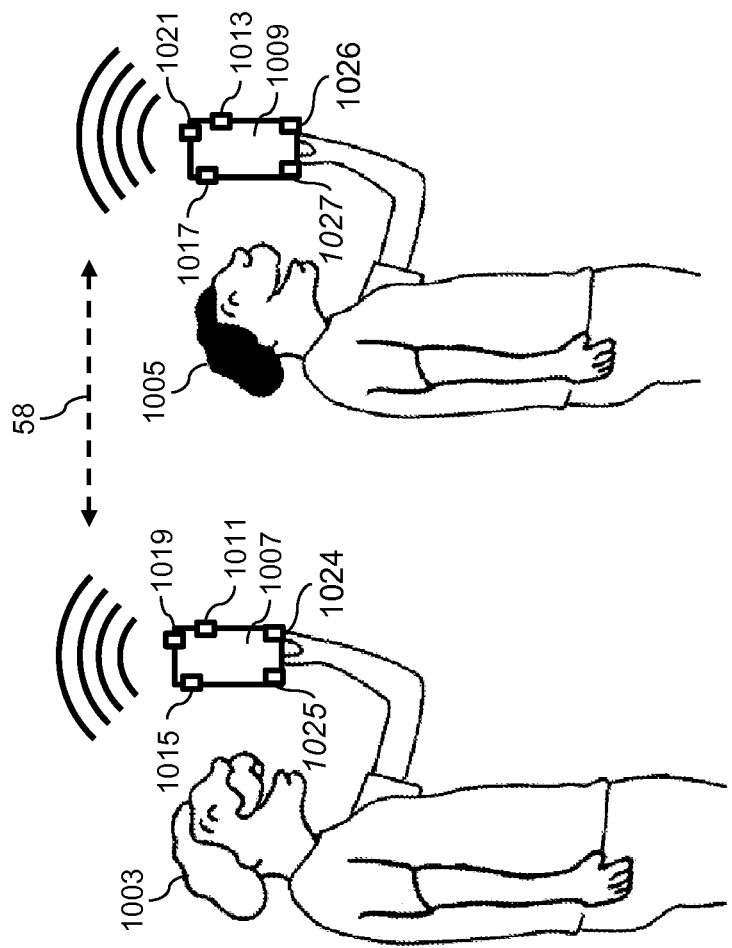

In some embodiments, one or both of the first digital camera 1007 and the second digital camera 1009 in FIG. 10 may include only a single capture unit. For example, the first digital camera 1007 may include only the first rear-facing capture unit 1015. Likewise, the second digital camera 1009 may include only the second forward-facing capture unit 1013. In this way, the method of the present invention can be performed using conventional digital cameras that do not include dual capture units.

In other embodiments, there are multiple second digital cameras 1009 sending video sequences of the scene to the first digital camera 1007. The first digital camera 1007 acts as a host and each of the multiple second digital cameras 1009 connects to the first digital camera 1007 using an appropriate network connection key. Once the wireless connections are established, the first digital camera 1007 selects one of the multiple video sequences being transmitted over the wireless network 58 using appropriate user controls 34. Then the processor 20 in the first digital camera 1007 then produces the composite digital video sequence 411 in accordance with the method of the present invention.

Figure 11:
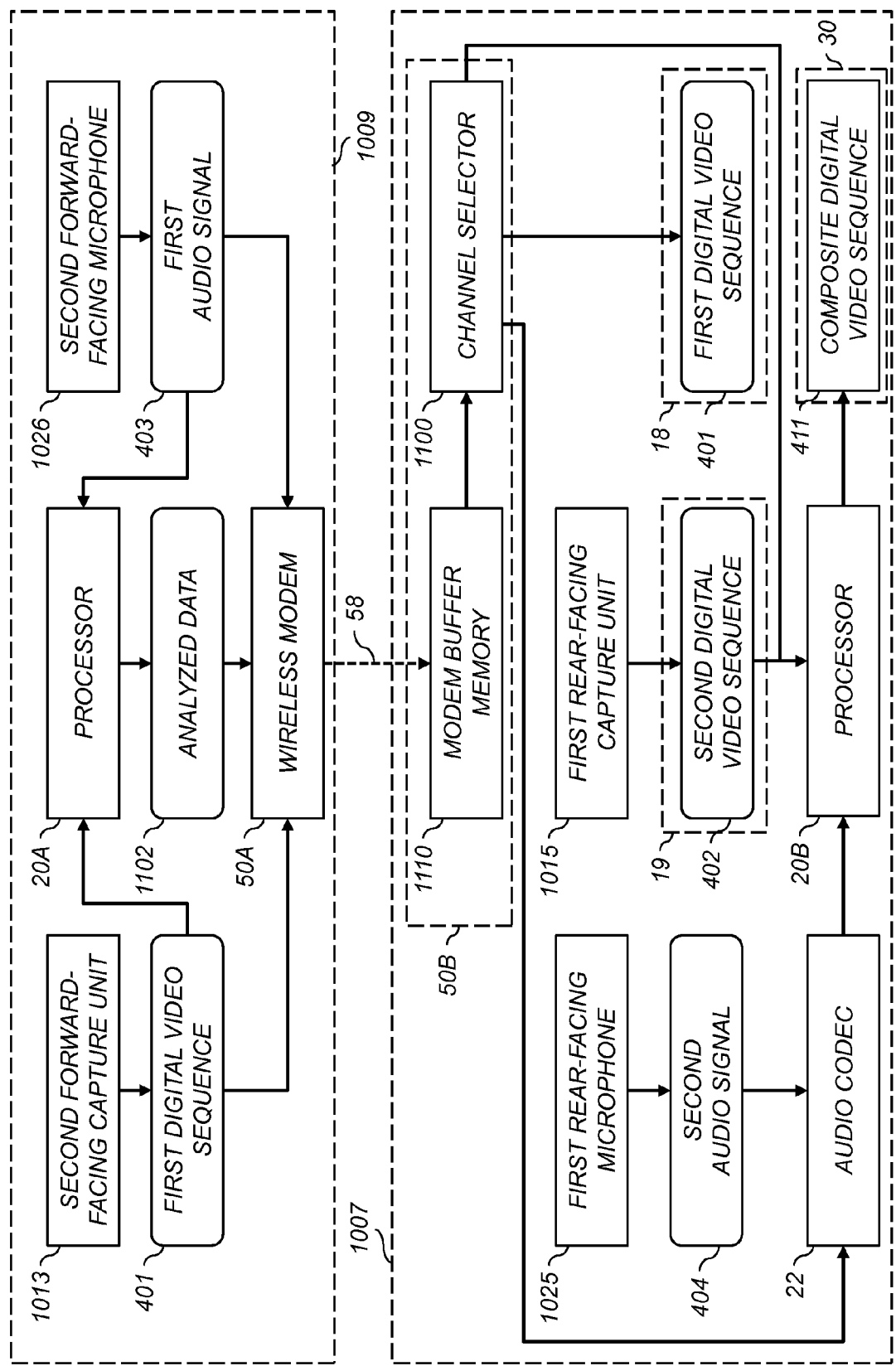
FIG. 11 is a block diagram showing components of a digital camera system including two digital cameras for forming a composite video system.

Additional details pertaining to the network compositing mode will now be described with reference to FIG. 11, which is a block diagram of a video processing system for the network mode composition. Once the network connection is established, the first digital camera 1007 and the second digital camera 1009 are set to operate in the network compositing mode. In this mode, the first forward-facing capture unit 1011 (FIG. 10) and the first forward-facing microphone 1024 (FIG. 10) in the first digital camera 1007 and the second rear-facing capture unit 1017 (FIG. 10) and the second rear-facing microphone 1027 (FIG. 10) in the second digital camera 1009 can be turned off since they are not needed.

In the second digital camera 1009, the second forward-facing capture unit 1013 is used to capture the first digital video sequence 401, and the second forward-facing microphone 1026 is used to capture the first audio signal 403. These signals are fed into processor 20A where they are analyzed to provide analyzed data 1102 using the aforementioned methods. (The analyzed data 1102 can include data such as detected faces, recognized faces and recognized speech included in the analyzed motion data 901, analyzed scene data 903 and analyzed audio data 905 as described with respect to FIG. 9.) The wireless modem 50A in the second digital camera 1009 is used to transmit the first digital video sequence 401, the first audio signal 403 and the analyzed data 1102 to the first digital camera 1007 using the wireless network 58.

The data transmitted from the second digital camera 1009 is received by wireless modem 50B in the first digital camera 1007 and stored in a modem buffer memory 1110. A channel selector 1100 directs the received first digital video sequence 401 to the first buffer memory 18. Likewise, the received first audio signal 403 is directed to the audio codec 22 and the received analyzed data 1102 is directed to processor 20B. The first rear-facing capture unit 1015 in the first digital camera 1007 is used to capture the second digital video sequence 402, which is stored in the second buffer memory 19, and the first rear-facing microphone 1025 is used to capture the second audio signal 404, which is fed into the audio codec 22. At this point, the processor 20B is used to form the composite digital video sequence 411 using the method that was described with respect to FIG. 9, which is then stored in the image memory 30.

If the first digital camera 1007 has established connections with a plurality of second digital cameras 1009, the channel selector 1100 selects the data received from one of the second digital camera 1009 to use in the process of forming the composite digital video sequence. In some embodiments, the first digital camera 1007 automatically analyzes the received data from the plurality of second digital cameras 1009 and selects the one providing data having a highest interestingness score. In one embodiment, interestingness score β for a particular second digital camera 1009 is computed as:

$$\beta = \frac{1}{h \times w} \sum_{x=1}^{h \times w} (1 - v_x) \quad (12)$$

where h and w are the height and width of the received first digital video sequence 401, and $v_x$ is the suitability score at each pixel given by Eq. (9).

The channel selector 1100 selects the selected network image sequence for time $T_R$, and then reevaluates whether the image data from a different second digital camera 1009 now has a higher interestingness score. In a preferred embodiment, $T_R$ is a constant and is set to 30 seconds. In other embodiments, the time $T_R$ can be manually set by the user using appropriate user controls 34.

In some embodiments, if there are multiple second digital cameras 1009 providing image data with the same interestingness score, then the data from each of these digital cameras can be stored in the modem buffer memory 1110 or the image memory 30. In this case, a network scheduling and process scheduling program can manage the multiple concurring network signals. The network scheduling and process scheduling techniques are well known in the art, hence, are not described herein.

In other embodiments, the user can manually select which of the plurality of second digital cameras 1009 should be used to provide the image data used to form the composite digital video sequence 411 using appropriate user controls 34. In still another embodiment, one of the second photographers 1005 operating one of the second digital cameras 1009 can send a signal indicating an importance value by using the user controls 34, or recognized speech. The importance value of the recognized speech can be ranked from a speech importance database stored in the firmware memory 28 where the database specifies the importance ranking of the recognizable speech. Then the channel selector 1100 in the first digital camera 1007 selects one the second digital camera 1009 having the highest received importance value.

In other embodiments, the channel selector 1100 can use the method described in the aforementioned U.S. Patent Application Publication 2011/0164105, which is incorporated herein by reference.

In some embodiments, the present invention is implemented using a software program that can be installed in a portable electronic device having at least one digital capture unit. For example, with reference to FIG. 3, the forward-facing capture unit 301 and the rear-facing capture unit 303 can be digital capture units in a Smartphone, a tablet computer or any other portable electronic device. In some embodiments, the software program can be an "app" which is downloaded to the portable electronic device, for example, using the wireless network 58. In accordance with the present invention, the software program can be executed to produce the composite digital video sequence 411. When the portable electronic device has at least two digital capture units, then the composite digital video sequence 411 can be determined using the methods and scenarios described with reference to FIGS. 3-9. When the portable electronic device has only one digital capture unit, then the composite digital video sequence 411 can be determined using the methods and scenario described with reference to FIGS. 10-11.

In some embodiments, the method of the present invention can be implemented by a digital electronic device that does not capture the first digital video sequence 401 and the second digital video sequence 402, but rather receives them from one or more other digital electronic devices that include the capture units. The first digital video sequence 401 and the second digital video sequence 402 can be received using the wireless network 58, or can be downloaded from the digital electronic devices that include the capture. For example, with reference to FIG. 10, a first digital camera 1007 can include a first rear-facing capture unit 1015 that provides the second digital video sequence 402, and a second digital camera 1009 can a include second forward-facing capture unit 1013 that provides the first digital video sequence 401. Another digital electronic device (e.g., a laptop computer) can then establish a wireless network connection (or a wired connection) with the first digital camera 1007 and the second digital camera 1009 and can receive the first digital video sequence 401 and the second digital video sequence 402, and can implement the method of the present invention to provide the composite digital video sequence 411.

A computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST

| | |
|---|---|
| 2 | flash |
| 4 | forward-facing lens |
| 5 | rear-facing lens |
| 6 | first adjustable aperture and adjustable shutter |
| 7 | second adjustable aperture and adjustable shutter |
| 8 | zoom and focus motor drives |
| 10 | digital camera |
| 12 | timing generator |
| 14 | first image sensor |
| 15 | second image sensor |
| 16 | first ASP and A/D Converter |
| 17 | second ASP and A/D Converter |
| 18 | first buffer memory |
| 19 | second buffer memory |
| 20 | processor |
| 20A | processor |
| 20B | processor |
| 22 | audio codec |
| 24 | forward-facing microphone |
| 25 | rear-facing microphone |
| 26 | speaker |
| 28 | firmware memory |
| 30 | image memory |
| 31 | GPS receiver |
| 32 | image display |
| 34 | user controls |
| 36 | display memory |
| 38 | wired interface |
| 40 | computer |
| 44 | video interface |
| 46 | video display |
| 48 | interface/recharger |
| 50 | wireless modem |
| 50A | first wireless modem |
| 50B | second wireless modem |
| 52 | radio frequency band |
| 58 | wireless network |
| 70 | Internet |
| 72 | photo service provider |
| 90 | white balance setting |
| 95 | white balance step |
| 100 | color sensor data |
| 105 | noise reduction step |
| 110 | noise reduction setting |
| 115 | demosaicing step |
| 120 | resolution mode setting |
| 125 | color correction step |
| 130 | color mode setting |
| 135 | tone scale correction step |
| 140 | tone scale setting |
| 145 | image sharpening step |
| 150 | sharpening setting |
| 155 | image compression step |
| 160 | compression mode setting |
| 165 | file formatting step |
| 170 | metadata |
| 175 | photography mode settings |
| 180 | digital image file |
| 185 | camera settings |
| 300 | photographer |
| 301 | forward-facing capture unit |
| 303 | rear-facing capture unit |
| 305 | scene |
| 401 | first digital video sequence |
| 402 | second digital video sequence |
| 403 | first audio signal |
| 404 | second audio signal |
| 405 | video multiplexer |
| 406 | motion analyzer |
| 407 | scene analyzer |
| 408 | audio analyzer |
| 409 | composite controller |
| 410 | composite instructions |
| 411 | composite digital video sequence |
| 501 | detected face |
| 502 | facial image region |
| 503 | facial video sequence |
| 505 | selected image region |
| 507 | candidate image region |

PARTS LIST -continued

| | |
|---|---|
| 509 | candidate image region |
| 511 | candidate image region |
| 513 | candidate image region |
| 601 | frame |
| 603 | first digital video sequence blending mask |
| 605 | facial video sequence blending mask |
| 607 | frame blending mask |
| 701 | picture frame border |
| 703 | warped facial video sequence |
| 705 | warped picture frame border |
| 707 | warped first digital video sequence blending mask |
| 709 | warped facial video sequence blending mask |
| 711 | frame blending mask |
| 801 | segmentation boundary frame |
| 803 | first digital video sequence blending mask |
| 805 | facial video sequence blending mask |
| 807 | frame blending mask |
| 809 | caption |
| 811 | segmented facial video sequence |
| 901 | analyzed motion data |
| 903 | analyzed scene data |
| 905 | analyzed audio data |
| 907 | facial region extraction instructions |
| 909 | frame instructions |
| 911 | blending instructions |
| 913 | audio composite instructions |
| 1003 | first photographer |
| 1005 | second photographer |
| 1007 | first digital camera |
| 1009 | second digital camera |
| 1011 | first forward-facing capture unit |
| 1013 | second forward-facing capture unit |
| 1015 | first rear-facing capture unit |
| 1017 | second rear-facing capture unit |
| 1019 | first wireless modem |
| 1021 | second wireless modem |
| 1024 | first forward-facing microphone |
| 1025 | first rear-facing microphone |
| 1026 | second forward-facing microphone |
| 1027 | second rear-facing microphone |
| 1100 | channel selector |
| 1102 | analyzed data |
| 1110 | modem buffer memory |

The invention claimed is:

1. A digital camera system, comprising:
a first video capture unit;
a second video capture unit;
a storage memory for storing captured video sequences;
a data processing system communicatively coupled to the first and second video capture units and the storage memory; and
a program memory communicatively connected to the data processing system and storing instructions configured to cause the data processing system to implement a method for forming a composite digital video sequence wherein the method includes:
using the first video capture unit to capture a first digital video sequence of a scene, the first digital video sequence including a first temporal sequence of video frames;
using the second video capture unit to capture a second digital video sequence including a second temporal sequence of video frames, wherein the second digital video sequence is captured simultaneously with the first digital video sequence and includes a photographer;
analyzing the first digital video sequence to determine a spatial image region having image content of low interest by assigning a suitability score to each of a plurality of image regions for one or more video frames of the first temporal sequence of video frames, wherein the suitability score comprises at least one of a motion score, a texture score, an image saliency score, and a facial presence score;

extracting a facial video sequence from the second digital video sequence corresponding to a facial image region in the second digital video sequence that includes the photographer's face;

inserting the extracted facial video sequence into the determined spatial image region to form the composite digital video sequence; and storing the composite digital video sequence in the storage memory.

2. The digital camera system of claim 1 wherein the first video capture unit is a forward-facing video capture unit and the second video capture unit is a rear-facing video capture unit.

3. The digital camera system of claim 1 wherein the first video capture unit and the second video capture unit and the data processing system are all components housed within a single integrated device.

4. The digital camera system of claim 1 wherein the data processing system is a component of a first device and at least one of the first video capture unit and the second video capture unit are components of a separate second device.

5. The digital camera system of claim 4 wherein the first device and the second device include wireless modems enabling them to communicate using a wireless network, and wherein at least one of the first digital video sequence and the second digital video sequence is received on the second device using the wireless network.

6. The digital camera system of claim 1 wherein the spatial image region is determined once and the extracted facial video sequence is inserted at the same location through the duration of the composite digital video sequence.

7. The digital camera system of claim 1 wherein the spatial image region is determined at a plurality of different times and the extracted facial video sequence is inserted at a plurality of different locations through the duration of the composite digital video sequence according to changing image content in the first digital video sequence.

8. The digital camera system of claim 1 wherein a higher facial presence score is assigned for faces that are recognized as corresponding to a person in a database of known persons than for unrecognized faces.

9. The digital camera system of claim 1 wherein the spatial image region is constrained to be an image region that does not include a face that is recognized as corresponding to a person in a database of known persons.

10. The digital camera system of claim 1 wherein the step of extracting the facial video sequence includes automatically analyzing the second digital video sequence to identify the facial image region.

11. The digital camera system of claim 10 wherein the identified facial image region is maintained in a fixed position across all of the video frames in the first digital video sequence.

12. The digital camera system of claim 10 wherein the step of identifying the facial image region includes the use of a face detection algorithm or a face recognition algorithm.

13. The digital camera system of claim 10 wherein a different facial image region is determined for different video frames of the second digital video sequence.

14. The digital camera system of claim 13 wherein the different facial image regions are determined using a face tracking algorithm.

15. The digital camera system of claim 10 wherein the step of extracting the facial video sequence includes cropping the second digital video sequence to extract the facial image region.

16. The digital camera system of claim 15 wherein the method further includes automatically analyzing the second digital video sequence to determine a boundary around a body of the photographer, and wherein at least some of the boundary of the cropped facial image region corresponds to the determined boundary around the body of the photographer.

17. The digital camera system of claim 1 wherein the step of inserting the extracted facial video sequence includes blending the facial image region into the first digital video sequence.

18. A method, comprising:
capturing a first digital video sequence of a scene using a first video capture unit, the first digital video sequence including a first temporal sequence of video frames;

capturing a second digital video sequence including a second temporal sequence of video frames using a second video capture unit, wherein the second digital video sequence is captured simultaneously with the first digital video sequence and includes a photographer;

analyzing the first digital video sequence to determine a spatial image region having image content of low interest by assigning a suitability score to each of a plurality of image regions for one or more video frames of the first temporal sequence of video frames, wherein the suitability score comprises at least one of a motion score, a texture score, an image saliency score, and a facial presence score;

extracting a facial video sequence from the second digital video sequence corresponding to a facial image region in the second digital video sequence that includes the photographer's face;

inserting the extracted facial video sequence into the determined spatial image region to form the composite digital video sequence; and storing the composite digital video sequence in a storage memory.

19. The method of claim 18 wherein extracting the facial video sequence comprises automatically analyzing the second digital video sequence to identify the facial image region.

20. The method of claim 19 wherein extracting the facial video sequence further comprises cropping the second digital video sequence to extract the facial image region.

21. The method of claim 20 further comprising automatically analyzing the second digital video sequence to determine a boundary around a body of the photographer, wherein at least some of the boundary of the cropped facial image region corresponds to the determined boundary around the body of the photographer.

22. A non-transitory computer readable storage medium, comprising instructions to cause a processor to:
capture a first digital video sequence of a scene using a first video capture unit, the first digital video sequence including a first temporal sequence of video frames;

capture a second digital video sequence including a second temporal sequence of video frames using a second video capture unit, wherein the second digital video sequence is captured simultaneously with the first digital video sequence and includes a photographer;

analyze the first digital video sequence to determine a spatial image region having image content of low interest by assigning a suitability score to each of a plurality of image regions for one or more video frames of the first temporal sequence of video frames, wherein the suitability score comprises at least one of a motion score, a texture score, an image saliency score, and a facial presence score;

extract a facial video sequence from the second digital video sequence corresponding to a facial image region in the second digital video sequence that includes the photographer's face;

insert the extracted facial video sequence into the determined spatial image region to form the composite digital video sequence; and store the composite digital video sequence in a storage memory.

23. The non-transitory computer readable storage medium of claim 22, wherein the first video capture unit, the second video capture unit, the processor, and the non-transitory computer readable storage medium are all components housed within a single integrated device.

24. The non-transitory computer readable storage medium of claim 22, wherein the spatial image region is determined once and the extracted facial video sequence is inserted at the same location through the duration of the composite digital video sequence.

25. The non-transitory computer readable storage medium of claim 22, wherein the spatial image region is determined at a plurality of different times and the extracted facial video sequence is inserted at a plurality of different locations through the duration of the composite digital video sequence according to changing image content in the first digital video sequence.

* * * * *